United States Patent [19]

Smith

[11] Patent Number: 4,722,681
[45] Date of Patent: Feb. 2, 1988

[54] INFRA-RED GENERATION

[76] Inventor: Thomas M. Smith, 1415 Golf Rd., Cinnaminson, N.J. 08077

[21] Appl. No.: 831,795

[22] Filed: Feb. 19, 1986

Related U.S. Application Data

[63] Continuation-in-part of Ser. No. 771,722, Sep. 3, 1985, and Ser. No. 752,908, Jul. 8, 1985, Pat. No. 4,604,054, and Ser. No. 592,793, Mar. 23, 1984, and Ser. No. 628,989, Jul. 9, 1984, Pat. No. 4,589,843, said Ser. No. 771,722, and Ser. No. 752,908, and Ser. No. 592,793, and Ser. No. 628,989, each is a continuation-in-part of Ser. No. 509,161, Jun. 29, 1983, Pat. No. 4,500,283, Ser. No. 567,270, Dec. 30, 1983, abandoned, Ser. No. 435,412, Oct. 20, 1982, abandoned, Ser. No. 312,730, Oct. 19, 1981, Pat. No. 4,443,185, Ser. No. 292,167, Aug. 12, 1981, Pat. No. 4,474,552, Ser. No. 279,081, Jun. 30, 1981, Pat. No. 4,416,618, Ser. No. 238,418, Feb. 26, 1981, Pat. No. 4,447,205, and Ser. No. 186,491, Sep. 12, 1980, Pat. No. 4,378,207.

[51] Int. Cl.$^4$ ............................................. F23D 14/12
[52] U.S. Cl. ........................................ 431/7; 431/328
[58] Field of Search ............................ 431/328, 329, 7; 126/92 AC

[56] References Cited

U.S. PATENT DOCUMENTS 3,697,447 10/1972 Bettinardi ............................ 431/328
4,255,123 3/1981 Bishilany et al. .................... 431/328

FOREIGN PATENT DOCUMENTS 0007037 1/1977 Japan ................................... 431/328

Primary Examiner—Margaret A. Focarino
Attorney, Agent, or Firm—Connolly and Hutz

[57] ABSTRACT

Improved burner constructions for gas-fired infra-red generators having ceramic fiber matrix through the thickness of which gaseous combustion mixture is passed and as it emerges it is burned to heat emerging surface to incandescence. Burner matrix can be loaded with silicon carbide particles to improve its emissivity, can be made water-repellent and its uniformity can be improved. Burner body can be casting, with sheet metal addition to form a baffle and air-seal and to grip matrix edges. Combustion mixture plenum can have movable partition assembly separating it from air seals, to adjust portion of matrix at which incandescence is generated. Metal screen can be stretched in front of incandescent surface to assist with low-temperature operation. Large size matrix can have central support fitted and secured to back of burner body. Air seal can be provided by narrow curtain of air extending around internal faces of burner body. Annealing lehr is desirably provided with gas-fired infra-red irradiation, and can have heat losses reduced by diminishing amount of metal used as in a conveyor to move workpieces through.

5 Claims, 31 Drawing Figures

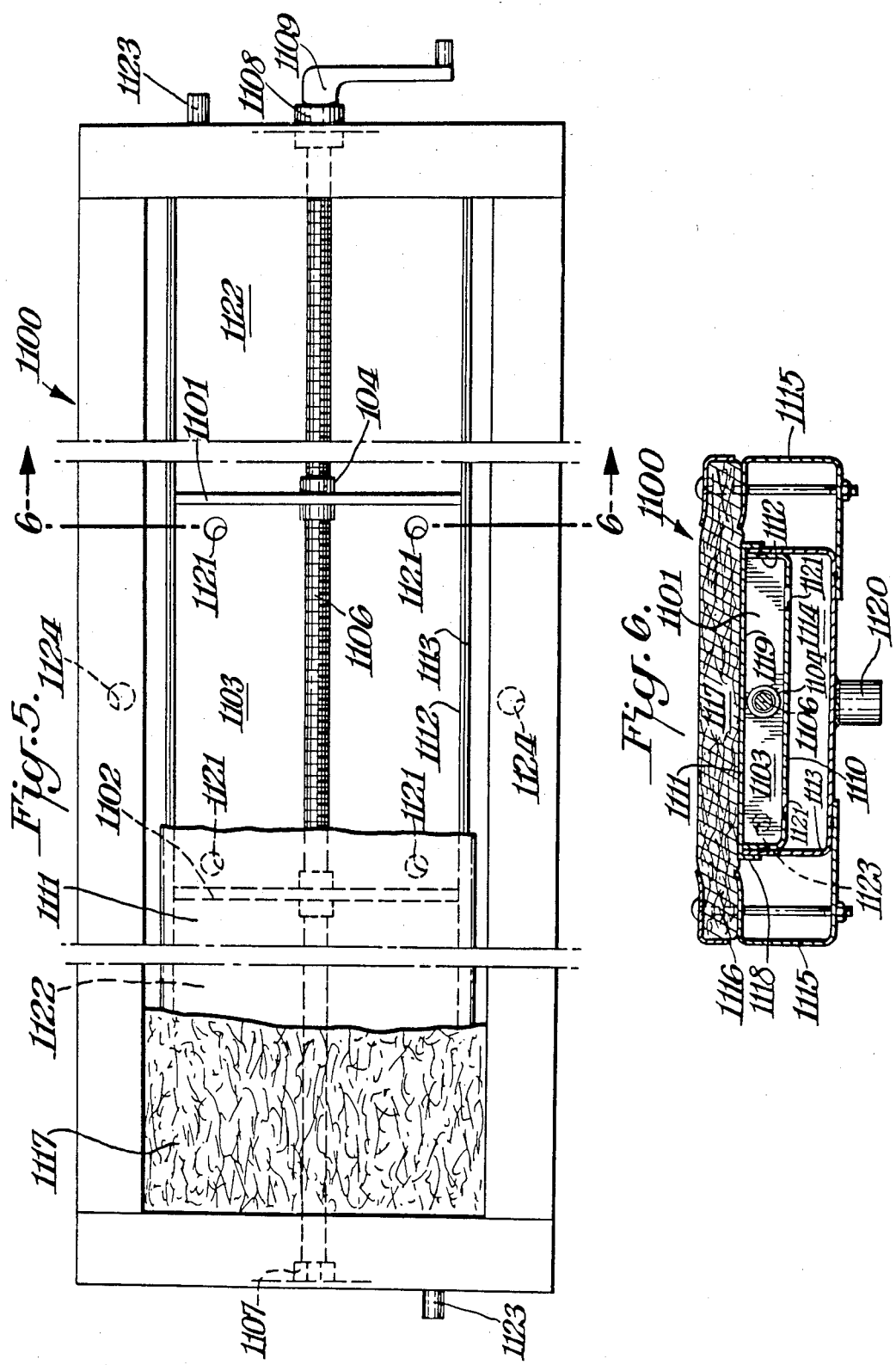

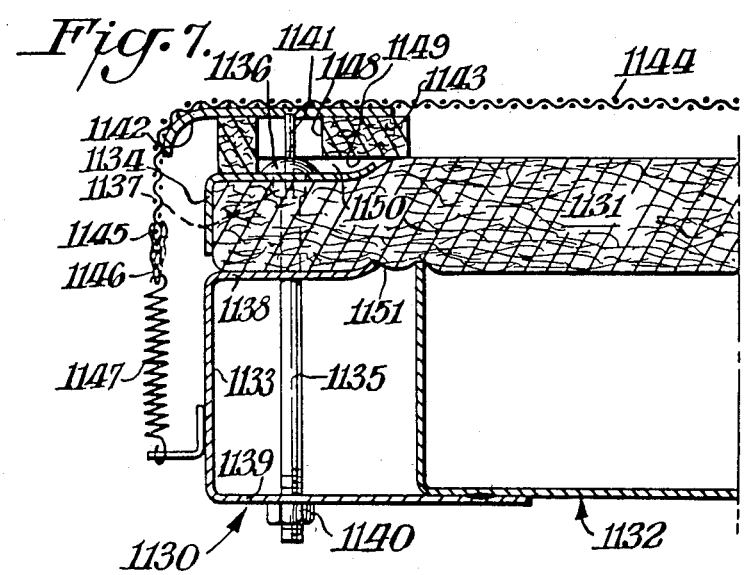

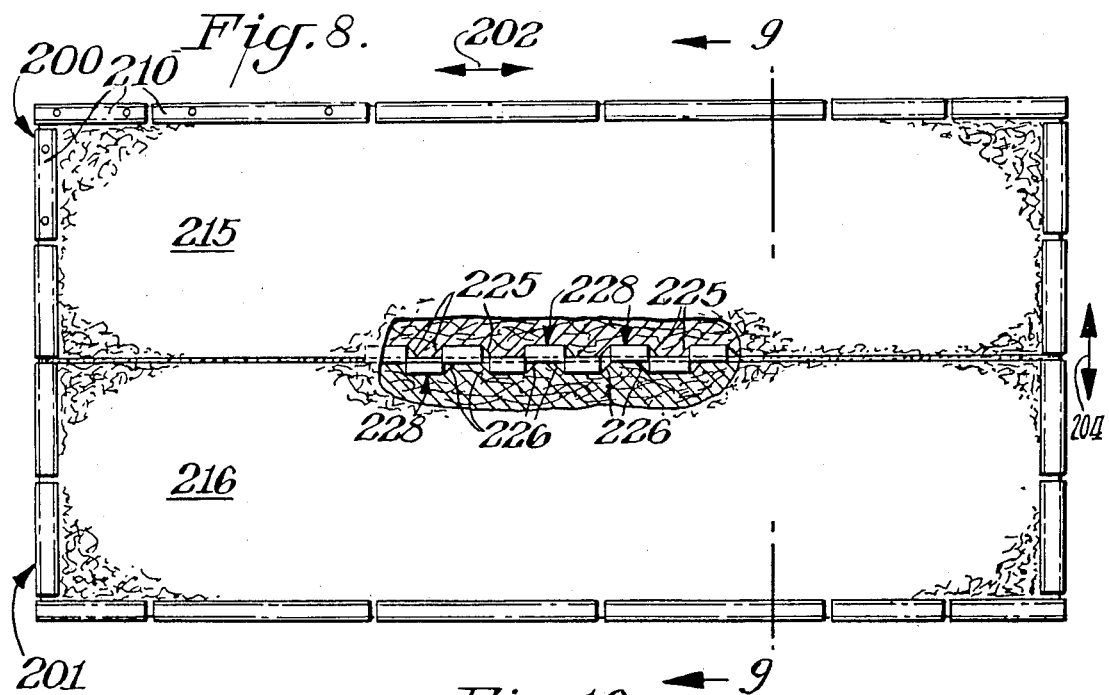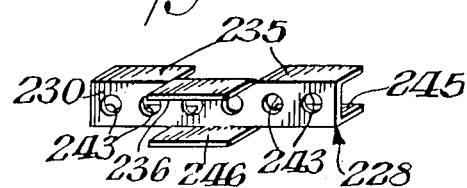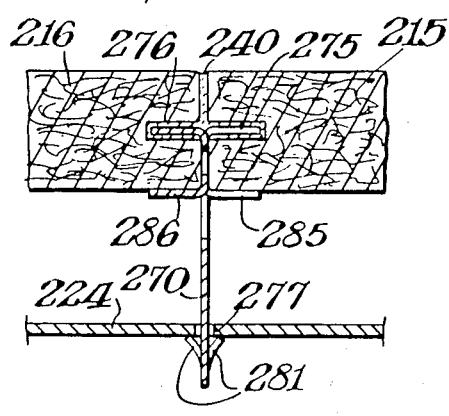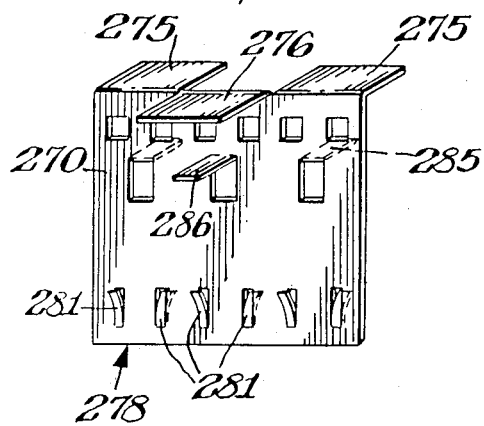

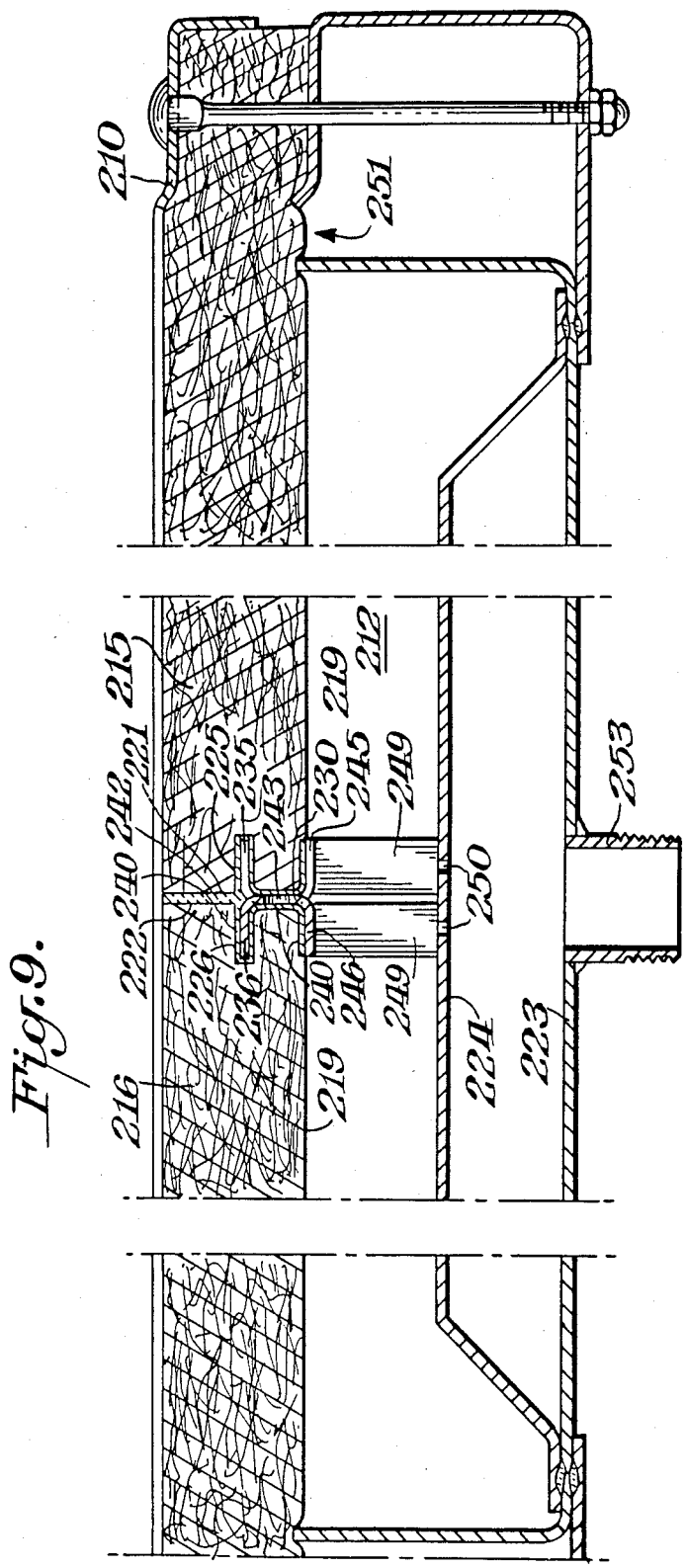

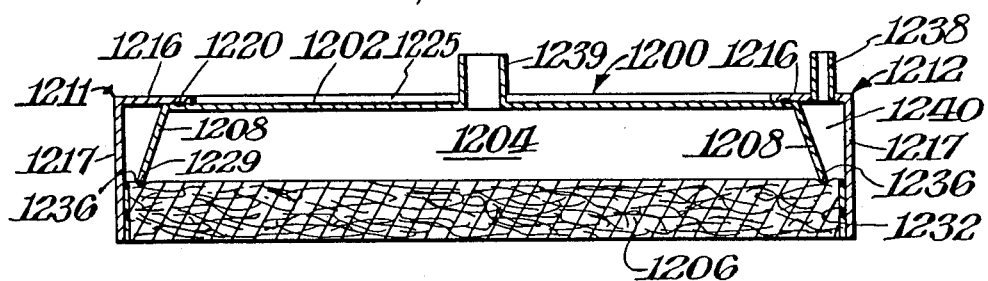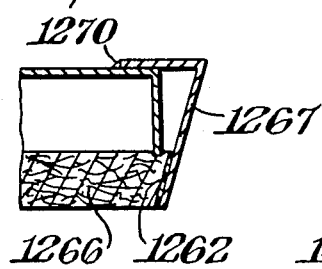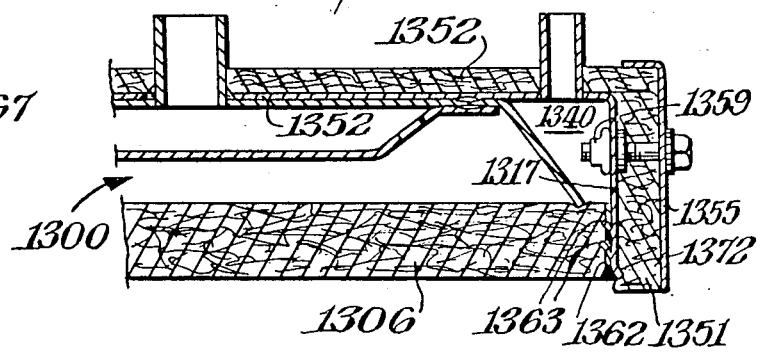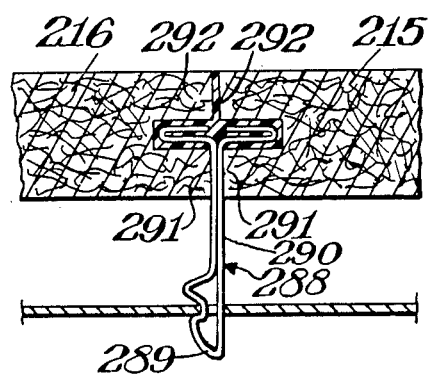

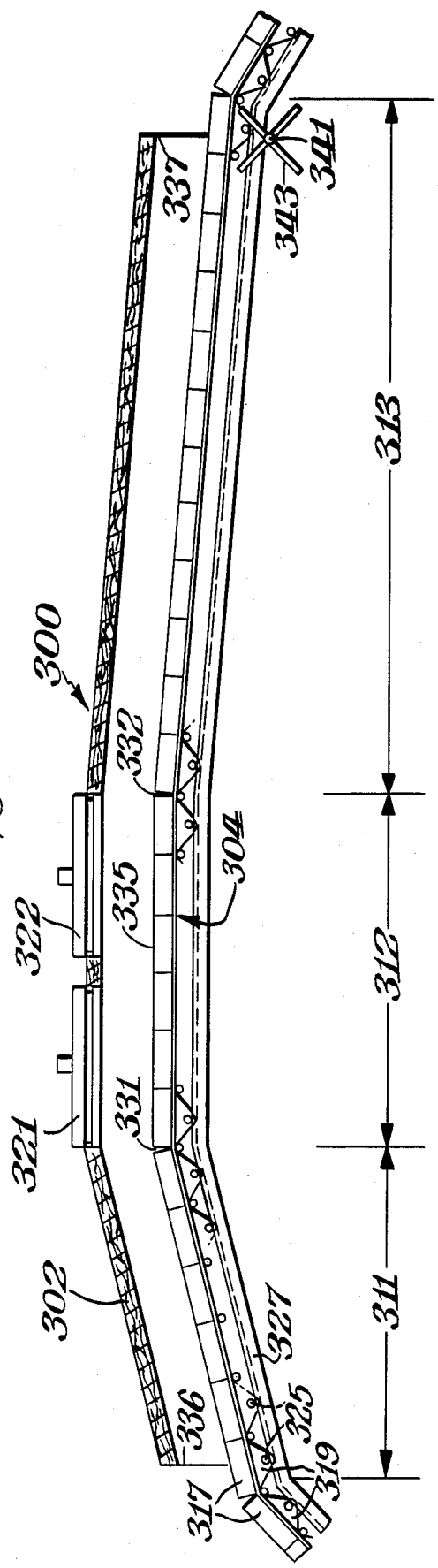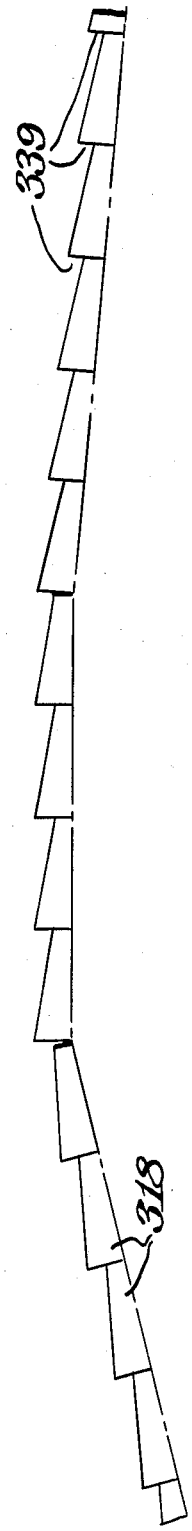
Fig. 14.
Fig. 15.

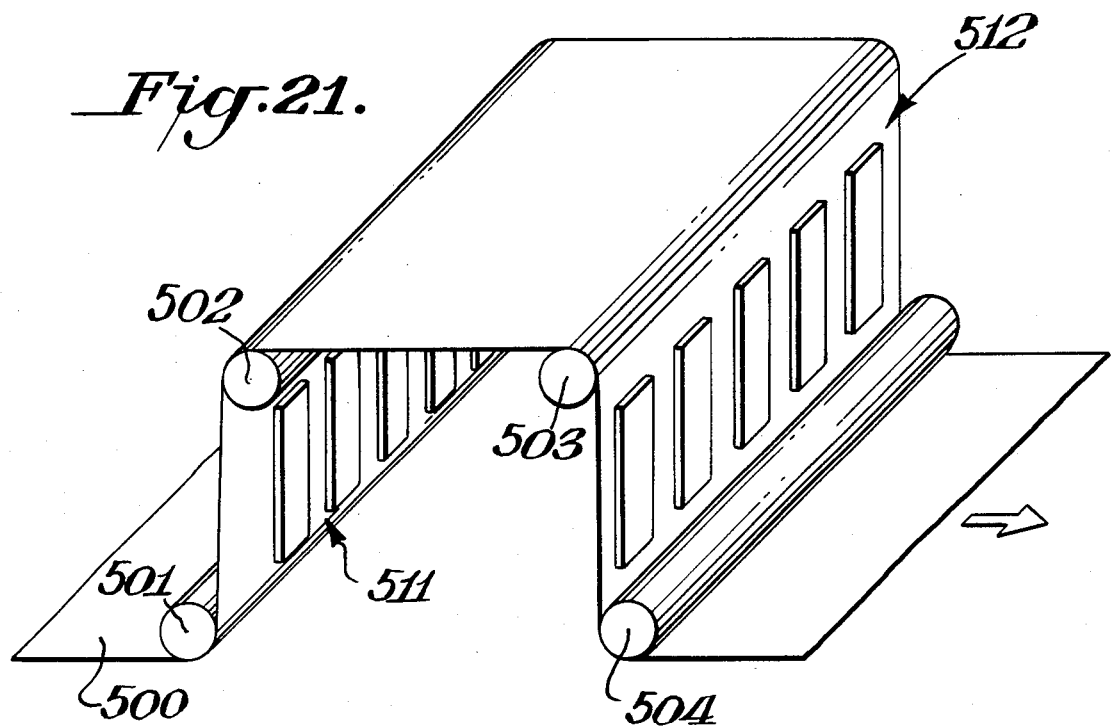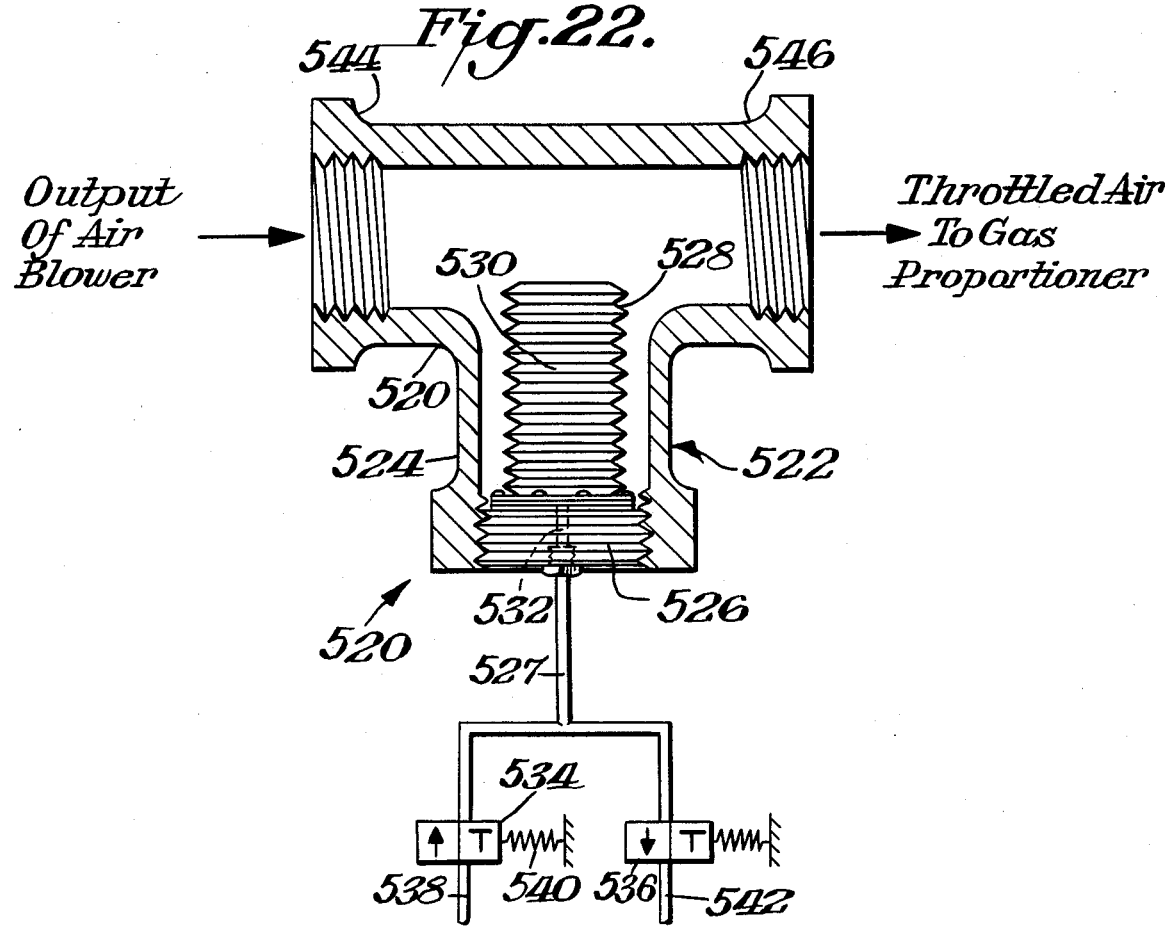

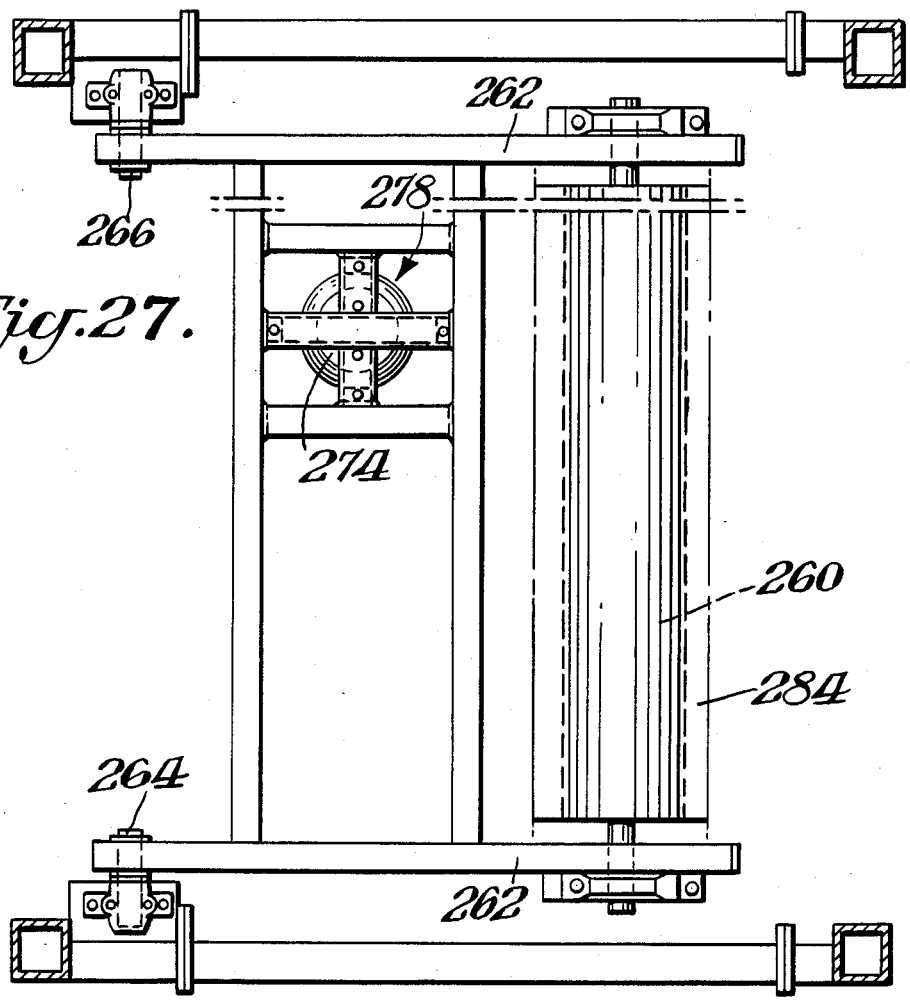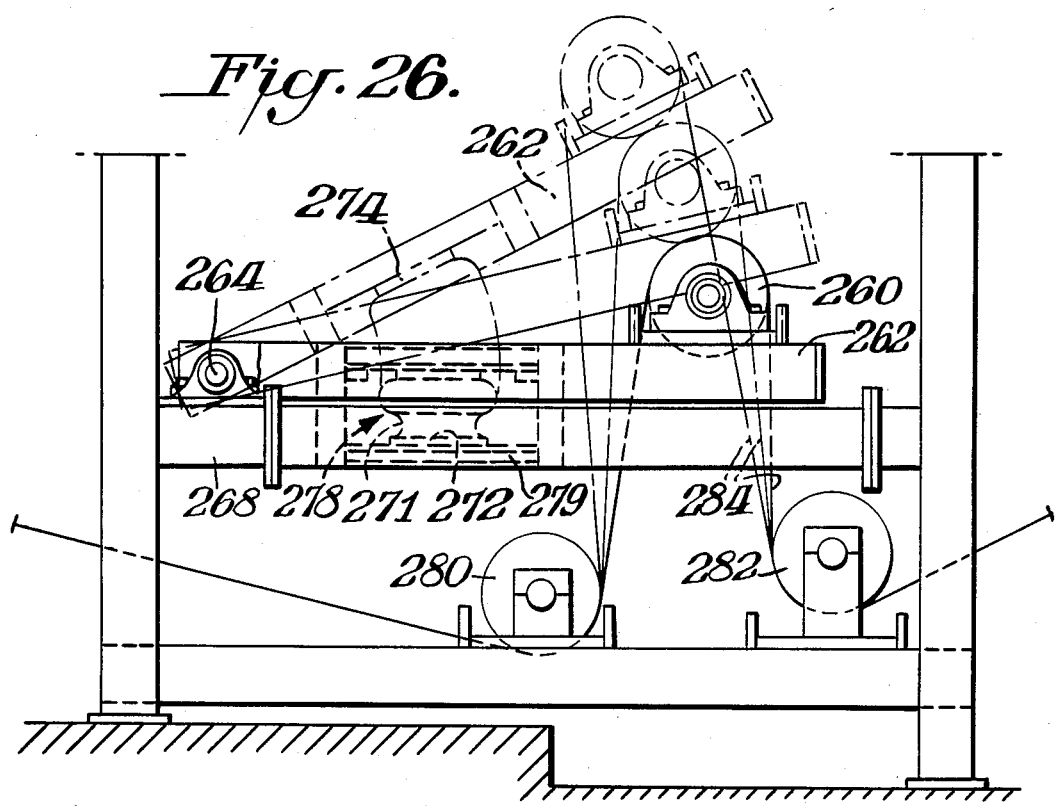

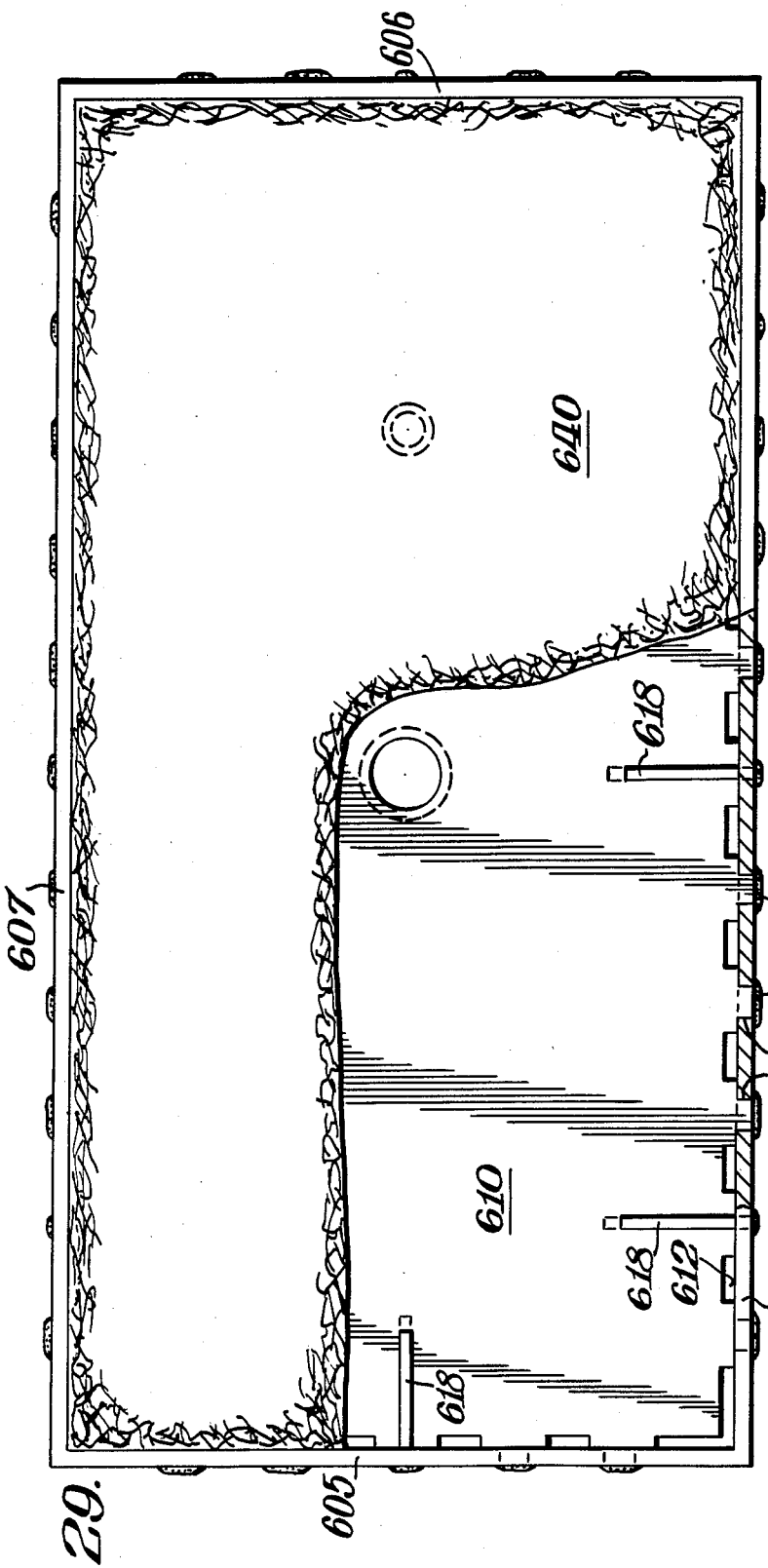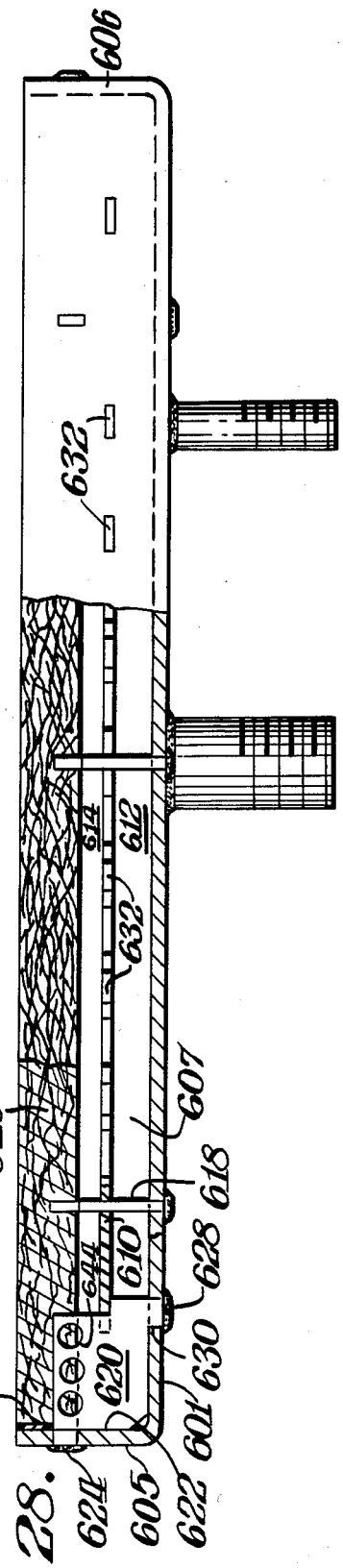

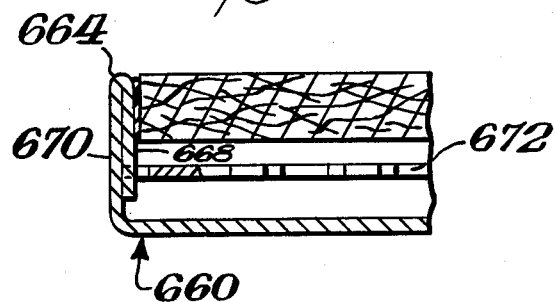
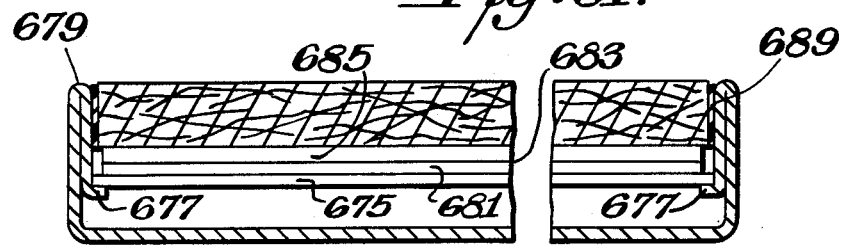

INFRA-RED GENERATION

The present application is a continuation-in-part of applications:

| Serial No. | Filed |
|---|---|
| 771,722 | September 3, 1985 |
| 752,908 | July 8, 1985(Pat. No. 4,604,054 granted Aug 5, 1986) |
| 592,793 | March 23, 1984 |
| 628,989 | July 9, 1984(Pat. No. 4,589,843 granted May 20, 1986) | which in turn are direct or chained continuations-in-part of the following earlier applications:

| Serial No. | Filed | Status |
|---|---|---|
| 509,161 | June 29, 1983 | 4,500,283 |
| 567,270 | December 30, 1983 | Abandoned |
| 435,412 | October 20, 1982 | Abandoned |
| 312,730 | October 19, 1981 | 4,443,185 |
| 292,167 | August 12, 1981 | 4,474,552 |
| 279,081 | June 30, 1981 | 4,416,618 |
| 238,418 | February 26, 1981 | 4,447,205 |
| 186,491 | September 12, 1980 | 4,378,207 |

The present invention relates primarily to apparatus and methods for treating substrates such as webs of paper, textile and non-wovens, which are manufactured in long lengths and are heat treated during or after their manufacture.

Among the objects of the present invention is the provision of novel apparatus and methods for effecting such heat treatment.

The foregoing as well as still further objects of the present invention will be more fully appreciated from the following description of several of its exemplifications, reference being made to the accompanying drawings wherein:

FIG. 5 is a plan view with portions broken away of an infra-red generator with an adjustable width according to the present invention;

FIG. 6 is a sectional view taken along line 6—6 of the infra-red generator of FIG. 5;

FIG. 7 is a sectional view similar to that of FIG. 6, showing a modified infra-red generator representative of the present invention;

FIG. 8 is a plan view partly broken away, looking down on the face of yet another burner representative of the present invention;

FIG. 9 is a sectional view of the burner of FIG. 8 taken along the line 11—11;

FIG. 10 is a detailed isometric view of a clip included in the burner of FIGS. 8 and 9;

FIGS. 11 and 12 are sectional views similar to that of FIG. 9, showing alternative constructions;

FIG. 13 is an detailed isometric view similar to that of FIG. 10, showing the modified clip used in the construction of FIG. 11;

FIG. 14 is a somewhat schematic side view of an annealing lehr representative of the present invention;

FIG. 15 is a detailed view similar to that of FIG. 14, showing a modification of that construction;

FIG. 18 is a vertical sectional view of yet another burner modification of the present invention;

FIGS. 19 and 20 are detailed views similar to that of FIG. 18, showing modifications of that construction;

FIG. 21 is an isometric, schematic view of an irradiation type moisture profiling technique in accordance with the present invention;

FIG. 22 is a cross-sectional view of a control valve pursuant to the present invention;

FIGS. 26 and 27 are side and plan views of an adjusting mechanism of the present invention;

FIG. 28 is a partially side view, and

FIG. 29 is a partly disassembled plan view of a further modified burner representative of the present invention; and FIGS. 30 and 31 are partial sectional views of additional burner modifications.

According to one aspect of the present invention, a gas-fired ceramic fiber matrix burner, various forms of which are described in the parent applications, is made with a cast metal body. Thus, such a casting can contain side walls and a back wall defining a plenum chamber, and a separate partition is secured to the interior of the body and partitioning the plenum chamber into a combustion mixture plenum surrounded by an air-seal plenum, the partition also separating the combustion mixture plenum into an unbaffled intake compartment and a baffled intake compartment.

The burner can also have an internal support which helps retain the matrix in the burner body and thus reduce the danger of having the matrix blown out by the pressure in its combustion mixture plenum.

According to another aspect of the present invention, a heat-treating apparatus has an elongated heating chamber through which workpieces are carried on a conveyor which presents to the heating chamber surfaces which are essentially entirely of thermal insulation, to thus reduce the heat carried out of the chamber by the conveyor.

Figure 1:
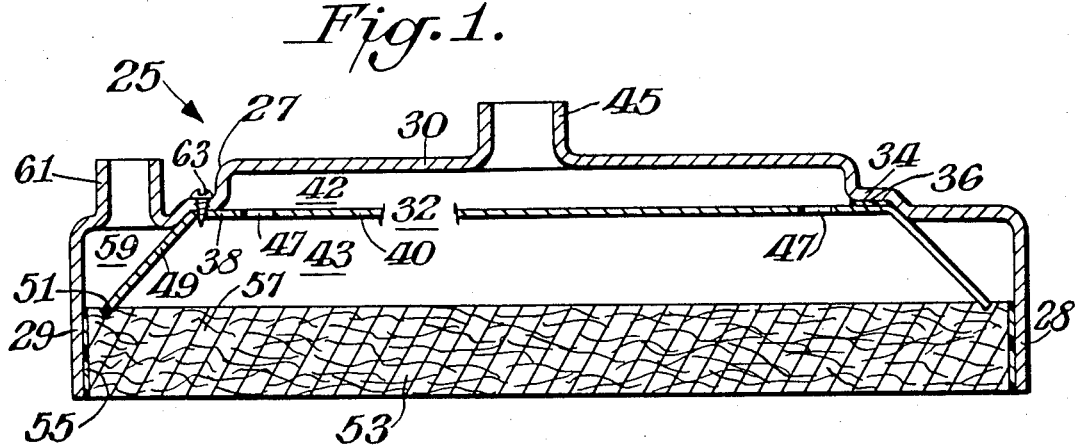
FIG. 1 is a sectional view of an infra-red generating heat-treating burner according to the present invention.

Turning now to the drawings, FIG. 1 shows a gas-fired burner 10 having a cast metal burner body 27 that includes side walls, two of which are 28 and 29, integral with a back wall 30, all defining a plenum chamber 32. Back wall 30 has a peripheral step 34 adjacent the side walls to provide a seat 36 which receives a partition 38 that can be made of sheet metal. Partition 38 is shown as an inverted dish, the central portion 40 of which divides plenum 32 into an unbaffled intake compartment 42 and a baffled intake compartment 43, for a fuel-gas combustion mixture supplied through a combustion mixture input connector 45 cast into back wall 30. A series of openings 47 near the margin of the central portion 40 of the partition provides passage of the combustion mixture from compartment 42 to compartment 43.

The peripheral portion 49 of partition 38 is inclined to flare out from the central portion 40 so it provides an edge 51, spaced about ½ inch from the adjacent side wall. A ceramic fiber matrix 53 which is preferably about 1 inch thick is fitted into the mouth of chamber 20 and is shown as having its margins cemented against the inner surfaces of the side walls with a thin layer of silicone adhesive 55. The internal face 57 of the matrix rests against partition edges 51, so the annular space 59 between the flared partition periphery 49 and the side walls defines an air-seal plenum having an air-seal air inlet connector 61. The combination is accordingly a gas-fired ceramic fiber matrix burner similar to those described in the parent applications.

Each of the compartments 42 and 43 need only be about ⅜ to ½ inch in depth, for burners having faces which are as wide and long as one foot by five feet containing a single combustion mixture inlet. Making those compartments deeper than about ⅝ inch adds unnecessary metal to the body casting and is not preferred even for wider or longer burners. Partition 38 itself can be extremely thin—less than 30 mils thick—to help hold down the overall depth of small burners. Larger burners can have partitions 38 as much as 60 to 70 mils thick to take advantage of the extra stiffening thus provided. The body wall thickness should be at least about 75 mils thick, to provide the extra stiffness helpful for burners having faces as large as one foot by twelve feet.

The air-seal plenum is sealed against leakage to or from the combustion mixture plenum, as by fitting a gasket or a layer of sealant such as silicone adhesive, into the seat 36 before the partition is fitted in place. In addition, the partition can be forced against that seat as by a series of screws 63 spaced along the seat, although the matrix alone will serve to hold the partition in position, if desired.

Where screws 63 are used, they can be of the sheet metal type penetrating through unthreaded holes in the burner body 27 and threadedly engaged in holes in the partition smaller than the width of the screw thread. Machine screws and nuts can alternatively be used, but in either case, a little cement can be applied to the screw shanks to help lock them in place against inadvertent loosening. The screws can be fitted with their heads outside the burner body, or inside the partition.

The burner body metal can be cast iron or cast aluminum or other metals, and can be a sand casting or a die casting. Cement layer 55 penetrates to a small depth into the pores at the matrix edges, and should not penetrate so deeply as to seriously impede the discharge of the air-seal air through the slot between partition edge 51 and the layer of cement. That slot should be about ¼ to about ⅝ inch wide, all around the burner. The partition 38 is preferably made of drawn 1010 steel or aluminum.

Figure 2:
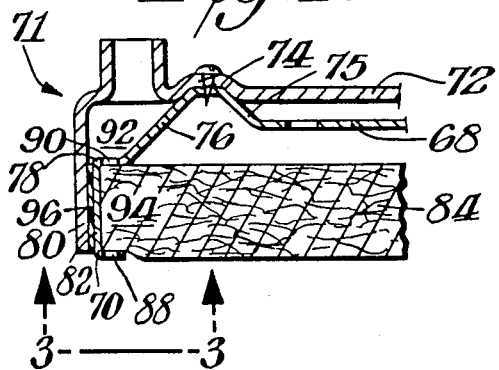
FIG. 2 is a similar sectional view of a modified heat-treating burner representative of the present invention.
Figure 3:
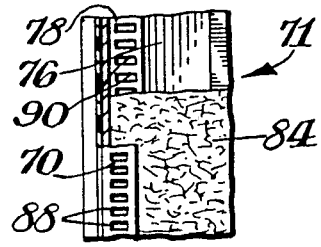
FIG. 3 is a broken-away view of the burner of FIG. 2, looking in the direction of lines 3—3.

FIGS. 2 and 3 show a modified burner construction in which among other things, a partition 68 has extensions 70 which are used to help lock the matrix in place. Burner 71 has a back wall 72 which is essentially entirely flat except for partition-positioning seat 74, and partition 68 has its periphery flare upwardly at 75 and downwardly at 76, continuing with a panel 78 extending outwardly to the body side wall 80, then downwardly at 82 along the edge of the matrix 84 to a bendable tab 70. That tab and panel 78 are both shown as densely perforated by slots 88 and 90 to permit relatively free passage of air-seal air from air-seal plenum 92.

Burner 71 can be assembled with tabs 70 extending down in line with panels 82, and after the matrix is inserted forcing those tabs down against the outer face of the matrix. This can be done before or after the partition is secured to the burner body, but the bending of the tabs is more readily effected before the partition is secured, inasmuch as the tab can then be bent over with the help of a squeezing tool that engages and squeezes panel 78 toward the tab while the tab is squeezed toward that panel. This squeezes the matrix margin 94 as illustrated in FIG. 2 and thus reduces the amount of air-seal that passes through the matrix edge, and reduces the air consumption of the burner. A layer of cement 96 can also be applied between the outside face of panel 82 and the inner face of body side wall 80, to further reduce the consumption of air-seal air. A layer of cement can also be applied between the edge of the matrix and the inner face of panel 82, but is not essential.

Tabs 70 need not extend along the full length of each burner side, but if they do they should be mitered or otherwise trimmed at the corners of the matrix.

The matrix-gripping channel formed by panels 78 and 82 along with tab 70 need not be integral with partition 68, but can be a separate channel or set of separate channels clamped around the matrix edges. Such a channel-gripped matrix can be held in the burner mouth by cementing and/or by screws threaded through the side walls and penetrating panel 82, or by screws penetrating side wall 80 and threadedly engaging panel 82.

If desired, the slots 88 in the tabs can be shortened or completely eliminated, thus directing most or all of the air-seal air past the inner edges of the tabs as that air moves out through the bottom of the matrix.

Figure 4:
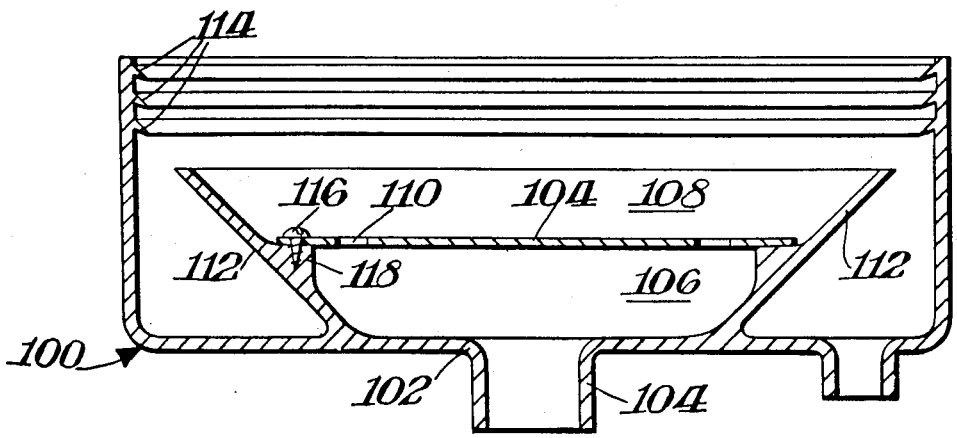
FIG. 4 is a sectional view of another burner construction of the present invention.

The burner 100 of FIG. 4 is also a casting of a burner body 102 having a sheet metal partition 104 that divides the input from combustion mixture inlet 104 into unbaffled compartment 106 and baffled compartment 108. However, partition 104 is merely a flat sheet with perforations 110, and an air-seal plenum is provided by cast internal partition walls 112. Also, inwardly directed teeth 114 on the inside surface of the burner side walls engage the edges of a matrix and help anchor the matrix in place when the matrix is cemented against those walls.

Partition sheet 104 need only be a little wider than the opening of input connector 104, but if made wide enough so it does not have much side room to shift, it can be held in palce by a single screw as at 116 against posts 118 integrally cast on partition 112. Where sheet 104 is only a little wider than the opening of input connector 104, the sheet does not need to be provided with perforations 110.

The burners can be equipped with pilot lights and/or with electrical ignition as described in connection with FIGS. 14 and 15 of parent application Ser. No. 952,332 and that description is incorporated in the parent specification as though fully set forth herein.

The burner 1100 of FIGS. 5 and 6 is of the all-sheet-metal body construction also described in Ser. No. 952,332. It has a pair of partitions 1101 and 1102 movable along a combustion mixture plenum 1103 that extends from one end of the burner to the other. As shown, the partitions are equipped with internally threaded screw followers 1104 through which penetrate a threaded adjusting rod 1106 pivotally received in bearings 1107 and 1108 at the burner ends. The ends of rod 1106 are threaded in opposite directions so that rotating the rod by means of handle 1109 at one end will move both partitions toward or away from each other.

Combustion mixture plenum 1103 is the space within a shallow metal trough 1110, and a porous metal plate 1111 overlying the trough. The trough has its side walls 1112 welded to a deep metal channel 1113 so as to provide a spacing 1114 between the floor of the trough and the floor of the channel. A spacing of about one inch makes the burner body sufficiently rigid and resistant to thermal warpage, even when the channel is made of 59 mil thick stainless steel sheet and the trough of the same thickness cold rolled steel.

Air-seal channels 1115 are shown welded to the floor of channel 1113 to provide air-seal plenums and to support the sides 1116 of the ceramic fiber matrix 1117. Plate 1111 can be made of porous sintered iron, steel or cooper or of ordinary steel perforated with closely spaced apertures, each less than about ¼ inch wide, and can have side edges 1118 bent downwardly to overhang the side walls of channel 1113 and thus hold itself in proper position. Plate 1111 can be welded to those side walls to further stiffen the burner body, if desired, in which event overhangs 1118 can be made shorter or completely eliminated.

The longer surface 1119 of plate 1111 should be relatively smooth, at least where it is engaged by partitions 1101 and 1102 so as to keep from frictionally damaging the partitions as they are slidably adjusted in trough 1110. Plate 1111 is also sufficiently rigid to keep from sagging between its supported edges. The floor of trough 1110 should likewise not sag.

Combustion mixture is shown as supplied through a nipple 1120 opening into the center of the floor of channel 1113. This mixture flows through spacing 1114 and then through holes 1121 in the floor of trough 1110. These holes are located in a section of the trough which is not reachable by the movable partitions. Those partitions are preferably plates of rigid poly(tetrafluoroethylene) or polyethylene closely fitted into plenum 1103 so as to do a good job of keeping the combustion mixture from the trough spaces 1122 on the outside of the partitions. Spaces 1122 are supplied air through connecting nipples 1123 and the pressure of that air in spaces 1122 is maintained about the same as the pressure in combustion mixture plenum 1103 to minimize leakage of the combustion mixture past the partitions. Both the combustion mixture in plenum 1103 and the air in spaces 1122 flows fairly readily through the porous plate 1111 and matrix 1117 and thus flushes out any leakage across the partitions in either direction so there is no build-up of trans-partition leakage. The threaded connection with adjusting rod 1106 accordingly does not have to be absolutely gas-tight. The use of Acme thread helps fit the threaded parts with minimum clearance, and a viscous grease lubricant helps further reduce or completely eliminate that clearance.

Air-seal air is shown as supplied to the air-seal plenums in longitudinal channels 1115 by means of connecting nipples 1124. There is no need for similar air-seal channels at the ends of the burner, inasmuch as partitions 1101 and 1102 provide such air seals. However, if the partitions are permitted to move to the very ends of the burner body, air-seal channels can be provided at those ends.

Instead of using a single adjusting rod 1106, two such rods can be arranged side by side and spaced from each other, but geared together with correspondingly spaced thread followers 1104 on the partitions. This modification helps assure that the partitions do not cock over while being adjusted. In the event the adjusting rod 1106 needs additional support, such a support can be fitted into the center of plenum 1103.

Where the combustion mixture and/or air are supplied from sources at pressures significantly above those maintained in plenum 1103 and spaces 1122, respectively, with valve restrictions to adjust the respective pressure drops, the valves are re-set to adjust those pressures when the partitions are moved. Moving them apart increases the outflow of combustion mixture and reduces the outflow of air so the effect of such valving is to change the pressures in plenum 1103 and spaces 1122. These valves can also be automatically adjusting valves connected to maintain their downstream pressures.

The porous plate 1111 of FIGS. 5 and 6 can be eliminated by mounting combustion mixture plenum channel 1110, along with the movable partitions 1101 and 1102 and the partition-adjusting mechanism, so it can be retracted about ¼ inch. Adjustments of the partitions can then be made by first retracting the retractable combustion mixture plenum combination, then sliding the partitions to the desired locations and finally restoring the combustion mixture plenum combination to firm engagement with the lower face of matrix 1117.

The burner of FIGS. 5 and 6 can be used to irradiate substrates of varying widths, without wasting irradiation from the extreme ends of the burner where those ends project beyond the substrate. When used with the auxiliary drying structures as described in the parent applications, it is helpful to make the side walls of that auxiliary structure adjustable like the burner partitions 1101 and 1102.

The varying burner widths can alternatively be provided with stationary partitions located at each edge of each substrate width. Such partitions can be made of then sheet metal welded in place, so they create plenum compartments each separately supplied with combustion mixture. Each supply can be with separate air and gas streams, and the gas supply arranged to be separately shut off when the supplied compartment is not to be used for irradiation. This leaves the air still flowing through that compartment when it is not irradiating, and thus maintains combustion mixture in the adjacent compartment sharply defined as it emerges from the matrix.

A series of such separate plenum compartments can be provided at each end of the burner and each compartment can be as little as one or two inches wide although they can be as wide as desired. The compartments do not have to be used, or even installed, in symmetrical arrangements.

The use of air seals at each edge of the burner matrix protects those edges from damage by burn back of the combustion mixture due to relatively stagnant flow in those locations. The burner constructions of FIGS. 17, 18 and 19 in the aforementioned Ser. No. 279,081 has no such stagnant flow and its matrix edge attachments are protected by the thermal conductivity of relatively thick metal, so that such construction can be substituted for the air-seal construction.

The thermal efficiency of either type of burner is improved by pre-heating the air and/or gas supplied to the combustion mixture. Thus, raising the temperature of the incoming combustion mixture from 70° F. to 100° F. or 120° F., enables a noticeable reduction in the amount of gas needed to maintain any radiation temperature at the matrix surface at which that mixture burns. So long as the ignition temperature of the gas is not reached, further increases in the temperature of the combustion mixture make for even further fuel saving. However, the matrix which ordinarily has a practically endless useful life, tends to have its life shortened when the combustion mixture is supplied at temperatures over about 160° F. and the hot matrix surface is operated at 1500° F. or higher. For matrix operation at lower temperatures, the incoming combustion mixture can be as hot as 250° F.

The burners generate very large quantities of hot combustion gases when they are in operation, so it is a relatively simple matter to route the combustion mixture supply conduits in the path through which those hot gases rise away from the burner and cause some heating by those hot gases. It will be noted, however, that in many cases the burner body itself tends to become heated by those hot gases, particularly if the burner is firing face down, so the combustion gases fed to the burner are heated by the burner body before they reach the matrix. It is the combustion mixture temperature when it reaches the matrix that is the critical temperature.

The efficiency of ceramic matrix burners is also increased by roughing the matrix surface on which combustion takes place, to cause some of the ceramic fibers to project out about one to three millimeters from the general plane of the surface. Thus, the combustion surface can be grooved as by milling or sawing a series of parallel grooves having the one to three millimeter depth and about ¼ inch to about ½ inch apart into that surface. The grooves can be cut in one direction, or can be criss-crossed over that surface, and the groove cross-section can be U-shaped or V-shaped.

When a burner is operating properly, the outer face of its matrix is incandescent but there is also a blue aura over and very close to that incandescence. That aura is best observed by looking across the incandescent surface from a point on the side and close to the plane of the incandescence.

By treating the outer face of the matrix so that fiber ends project into the blue aura, those ends become somewhat more incandescent than the remainder of the matrix face. Having at least about five ends per square centimeter of gross matrix surface provides a detectable increase in infra-red radiation as compared to the total absence of projecting fibers. Further increases of the number of projecting fiber ends per square centimeter further increases the radiation, until the projecting fibers become so crowded together, less than ½ millimeter apart. At those densities, the matrix face from which those incandescent ends project shows a drop in incandescence.

Between the foregoing low density and the high density of the projecting fibers, it appears that those fibers are heated by the blue aura to a temperature higher than the temperature of the remainder of the matrix, without lowering the temperature of the remainder of the matrix.

A similar increase in efficiency is obtained by substituting any other heat-resistant material for the projecting fibers. Thus, an 80-mesh screen of 5-mil nichrome wire can be fitted over the matrix and spaced about ⅛ inch from its outer face, so the matrix and the screen wires become incandescent when the burner operates. The resulting radiation is more intense than is obtained with an ordinary matrix and without the screen, all other things being equal. Also, the blue aura is no longer visible when the matrix carries the spaced screen. The radiation-boosting effect of metal screening is diminished when the screen wires are as thick as 15 or more mils. Non-metallic fibers can be as thick as about 20 mils before they begin to lose their boost effectiveness.

Silicon carbide fibers can be interfelted with the usual alumina-silica fibers or chromia-containing alumina-silica fibers from which matrixes are made (see U.S. Pat. No. 4,378,207), so that the silicon carbide fibers form part or all of the incandescent surface of the matrix. Such a matrix with as little as 5% by weight silicon carbide fibers at its incandescent surface shows a greater infra-red generating efficiency, apparently because silicon carbide has a greater emissivity for infra-red radiation. Powdered silicon carbide can alternatively be mixed with the alumina-silica or chromia-containing alumina-silica fibers or other ceramic fibers as they are felted, or can be impregnated into the radiating face of the matrix after it is felted, along with a binder such as ball or bentonite-type clays or sodium silicate or added starch, to also improve its emissivity and effectiveness. Thus, about 5% to about 34% by weight of silicon carbide particles ranging from about 2 to about 100 microns in size, based on the total weight of the final matrix, can be readily incorporated in a matrix-forming mixture while it is being felted, with little or no increase in the quantity of starch or other binder normally used for making matrixes which do not contain added powder. A 20% by weight addition of silicon carbide powder particles about 3 to about 50 microns in size to a chromia-containing alumina-silica fiber mixture provides a matrix having an improved emissivity that can be readily detected without instruments, whether such a powder-containing matrix is a full inch thick, or whether it is only ¼ inch thick and is laminated to a backing matrix that contains no silicon carbide.

For some purposes it is desirable to operate matrix burners with their matrix faces at temperatures below 1100° F. which is the normal lower limit, and with an efficiency greater than is possible from a matrix impregnated with a combustion catalyst such as platinum. In a burner operating with an ordinary ceramic fiber matrix, turning down the combustion mixture flow will lower the incandescence intensity until the incandescence corresponds to a color temperature of about 1100° F. Further flow reduction renders the burning unstable, causing localized flickering, and the blue aura becomes a flickering flame. When this happens the previously incandescent matrix surface has cooled to below 400° F. and the burner is not generating sufficient infra-red energy to be commercially useful.

According to the present invention, commercial operation at color temperatures as low as 950° F. is provided by mounting about ½ inch from the outer face of the matrix a metal screen having a mesh from about 50 to about 100 wires per inch, with the wires about 3 to about 7 mils thick. Placing such a screen over the unsatisfactory flickering flame arrangement just described, stops the flickering, causes the matrix to return to a uniform incandescence, substantially eliminates the flame, and the screen wires become heated to a color temperature slightly lower than that of the matrix, as viewed from outside the screen. The net result is to efficiently provide infra-red radiation at an effective color temperature from 1100° F. down to about 950° F.

FIG. 7 shows such a screen-covered burner 1130 which has a standard matrix 1131 clamped to a burner body 1132 provided with an encircling air-seal plenum channel 1133. A series of metal hold-down angles 1134 extending around the edges of the matrix are clamped down against those edges by a series of carriage bolts 1135 whose enlarged heads 1136 engage the upper faces of the angles and whose square shank portion 1137 is fitted through a corresponding square punched-out hole in the angles. Each bolt also fits through aligned holes in the upper and lower webs 1138 and 1139 of the air-seal channel, and is clamped down by a nut 1140 threaded over the extending end of the bolt and threadedly tightened to compress the matrix edges.

In FIG. 7 the heads 1136 of some of the carriage bolts are drilled and tapped to threadedly receive flat-head screws 1141 which hold a guide plate 1142 and a spacer frame 1143 against the hold-down angles 1134. The frame and guide plate extend around the periphery of the matrix, and over the guide plate is secured screen 1144. The screen is shown as having one edge gripped into a folded and crimped metal securing strip 1145 provided with an eyelet 1146 resiliently secured to the burner body by coil spring 1147. The other end of the spring is hooked around a support spot-welded to the body or fitted under nut 1140. Two opposite edges of the screen 1144 can thus be mounted, and if desired, all four screen edges can be mounted this way. It is preferred, however, for the screen to be a series of narrow strips held side by side by the illustrated mountings at one or both ends of each strip.

Frame 1143 is preferably of felted ceramic fibers apertured at 1148 to receive screws 1141 and the heads 1136 of the carriage bolts. In addition, the lower surface of the frame can be relieved at 1149 to better fit against the edge of the matrix. This relief provides a space 1150 which can receive most or all of the air-seal air blown through the matrix from slot 1151 in the air-seal plenum. Diverting this air away from the exposed outer face of the matrix 1131 leaves that face in better condition for very low temperature operation. For this purpose, space 1150 opens to the ambient atmosphere at each frame corner as well as at any other desired location, such as through extra escape holes cut into the frame.

Screen 1144 should have a mesh of from about 50 to about 100 wires per inch, with the wires from about 3 to about 7 mils thick. While a ½ inch spacing from the outer face of the matrix gives best results, the spacing of the screen can be as little as ¼ inch and as much as ¾ inch and still provide a stable effective color temperature below 1100° F. The screen can also be fitted to burners that have no air seals, or to burners having air seals that project out air streams which are not diverted away at they are in FIG. 7.

The low temperature operation and the operation with little or no blue aura at higher temperatures are particularly desirable for generating infra-red energy with extremely small degrees of NOX emissions. Their CO emissions are also quite small and can be further reduced as by adjusting the combustion mixture to have up to about 20% excess air. They are thus highly suited for use indoors, without chimneys or flues, to warm people or animals.

Burning a gaseous hydrocarbon fuel at the surface of a ceramic fiber matrix has been found to yield exceptionally small amounts of carbon monoxide and nitrogen oxides. Burners of this type are accordingly highly suited for industrial and domestic space heating by merely facing the incandescent matrix toward the space and the people to be warmed. The gaseous combustion products leaving the matrix can thus be permitted to enter and diffuse through the space being warmed, without increasing the carbon monoxide and nitrogen oxide content of the air in the space as much as it would be increased by open flames of conventional fuel-fired heaters or even cooking ranges. A matrix-type space heater is accordingly very inexpensively installed. Since it is also a very effective generator of infra-red energy and warms both through such infra-red generation, as well as by the heating effects of its hot combustion products, it also makes a highly efficient installation.

If desired, such a space heater can be equipped with a hood that collects its combustion products as they rise from a laterally directed vertical matrix face, for example, and vents them through a chimney or stack. Inasmuch as matrix combustion is essentially stoichiometric, there can be essentially no excess air in those combustion products so the cross-sectional area of the stack or chimney can be quite small.

The infra-red heating of the present invention can be applied as the first or the last heat treatment stage of a wet web, or at any intermediate point in the drying of the web. Because the gas-fired burners have an exceedingly high power density and can be made of almost diminutive size, they can be readily fitted into compact spaces and retrofitted into many prior art types of dryers.

FIG. 9 shows the construction of FIG. 8 modified to use wire screening 1508 such as stainless steel screening made of 10-mil thick wires woven 40 mesh to the inch, in place of the sheet metal protectors for the external surfaces of the thermal insulation. Such screening provides the desired protection without the need for the metal cutting and bending equipment needed to provide the sheet metal protection. The screening can be tucked in between the clamping angles 1541 and the matrix 1540 before the clamping angles are clamped in place, so that no special screen anchoring structure is needed.

The burner construction 200 of FIGS. 8, 9 and 10 has a matrix 201 which is not only long in the direction marked 202, but quite wide in the perpendicular direction 204. It has been no great problem to build individual burners that extend 12 feet or more so as to span the entire width of a paper, carpet or textile web being manufactured, but the matrix material is not sufficiently strong to also permit such burners to be wide as well as long.

Although the four edges of the matrix 200 are securely clamped under hold-down angles 210, as in the construction shown in detail in FIGS. 6 and 7 of parent U.S. Pat. No. 4,272,238, the pressure in the combustion mixture plenum 212 is sufficient to cause the matrix to belly outward when the matrix is too extensive. Thus, burners having the foregoing matrixes generally extend no more than about 14 to about 18 inches in direction 204, even though the extent in direction 202 can vary from about 2 feet to 12 or more feet.

The burner matrix 201 of FIG. 8 is made of two adjacent matrix strips, 215, 216 each about 6 feet long in the 202 direction and about 15 inches wide in the 204 direction. The two strips are joined together side-by-side and clamped as a unit over a burner body 220 to cover and enclose the combustion mixture plenum 212. That plenum can be formed from a metal box 223 as much as about 1¾ inches deep, with an internally positioned diffuser channel 224 about half that depth welded to the floor of the box.

Matrix strips 215, 216 have a series of short rabbets 225, 226 about ¾ inch deep cut in their mating edges 221, 222. These rabbets are located so as to receive flanges 235, 236 of a thin sheet metal clip 228 that has a web 230 spanning the portion of the mating matrix edges 221, 222 extending between the rabbets and the internal face 219 of the matrix strips. Clip 228 also has two additional ears 245, 246 that rest against those internal matrix faces 219 on the respective matrix strips.

The clip is also cemented to both matrix strips using any of the adhesives referred to in U.S. Pat. No. 4,272,238 for cementing matrixes. The adhesive is shown at 240 as interposed between all parts of the clip and the respective matrix faces. It also essentially fills the gap 242 between the matrix edge portions that do not engage the metal clip. That clip can be as little as 20 to 30 mils thick so that gap 242 is not substantial. The gap can be further diminished in width by having the matrix strip edge faces 221, 222 cut a little deeper in those sections that are engaged by the web of the clip. Also that web can be perforated as shown at 243 to provide more strip-to-strip bonding through those perforations.

As illustrated in FIG. 9, the ears 245, 246 of the clip are secured to the diffuser 224 by permanent magnets 249 shaped to extend between these members and resist the matrix-bellying forces developed in plenum 212. Even though the combustion mixture pressure in that plenum may be 5 inches or less of water column, the total bellying force on a two foot-by-two foot matrix is over 100 pounds. A matrix having a thickness of 1¼ inches cannot be depended upon to remain completely unbellied under those conditions, and once it begins to belly out its infra-red radiation is distorted and the resistance of the matrix to bursting open is reduced.

Magnets 249 should be sufficiently strong to entirely overcome the bellying forces. A number of clips can be used as shown in FIG. 8, so that a sufficient number of magnets can be fitted to make sure the bellying forces are overcome. Also, apertures 250 can be provided in the diffuser under the magnets, so that a knock-out plate carrying thin studs can be inserted with its studs fitted through the apertures and struck with a hammer to unseat a set of magnets. This makes it easier to remove a matrix after it is assembled and magnetically mounted in place. The knock-out plate can be inserted through a combustion-mixture inlet nipple 253.

The clips and the diffuser can be made of inexpensive cold-rolled steel stock, but care should be taken to have their magnet-engaging surfaces very flat if maximum magnetic coupling is desired. It is generally not necessary to have the clips extend more than about a third of the length of the joint between matrix strips, and for matrix lengths not over about 3 feet in the direction 202, a single clip about 6 inches long is all that is needed.

It is preferred to apply the adhesive along the entire length of the matrix joint before the clips are inserted and the matrix strips clamped together in mating position until the adhesive sets. For long joints it is helpful to apply the adhesive rapidly as by a spraying operation so that it does not cure before the assembling is completed.

Where the distance between the rabbets and the outer matrix faces is at least about ⅜ inch and the flanges 235, 236 not over about ¾ inch wide and two inches long, the clips do not significantly interfere with the flow of combustion mixture and the incandescence at the outer matrix surfaces is not significantly lessened immediately adjacent the joint. At the joint itself there is a thin line at which no significant combustion takes place, but this is of no consequence.

Three or more matrix strips can be similarly joined to make matrixes even wider in the 204 direction. However, the amount of concentrated infra-red energy used commercially is such that an incandescent width in the 204 direction need be no greater than about 25 inches.

A feature of this jointed construction is that a single wide burner (in the 204 direction) can be used where two narrower burners have been used previously. A single set of expensive burner controls and piping can accordingly be used in place of two such sets, so that the cost of burner installations is sharply reduced.

Clip 228 of FIGS. 8–10 can be modified by lengthening its web 230 so that it extends closer to diffuser wall 224. This enables the use of shorter magnets. Ears 245, 246 can then be located at the lower end of the extended wall, and omitted from the location where they engage matrix faces 219.

Instead of magnetically clamping a matrix joint to the combustion plenum wall, the clamping can be mechanically provided. FIGS. 11 and 13 show such a modification.

In FIG. 11 a joint between matrix strips 215, 216 is like the joint of FIG. 9, but a different clip 278 is used. Clip 278 has flanges 275, 276 like the corresponding flanges 235, 236, and ears 285, 286 similar to but not as long as ears 245, 246 in their extent along the joint. Web 270 of clip 278 is much longer than web 240, and extends far enough to penetrate into a slot 277 provided in the diffuser wall 224. The web is locked in such penetrating position by a set of springy tangs 281 struck out from the web and extending in opposite directions. These springy tangs offer very little resistance to pushing the clip web into slot 277, but offer enormous resistance to withdrawal of the web after the insertion is deep enough to cause the tangs to spring out to their illustrated positions.

For removal of matrix assembled and clamped as in FIG. 11, a plier-like tool can be inserted through the combustion mixture nipple to squeeze the tangs into the slots from which they were struck out, thus permitting the withdrawal without damaging the matrix.

FIG. 12 shows a construction like that of FIG. 11, but using a joint clip 288, or a series of such clips, in place of clips 278. Clip 288 has a resilient sheet metal hairpin-type snap-in cammed latch 289 that permits matrix mounting as readily as the clips of FIG. 11. However, the unlatching of clip 288 is somewhat simpler to effect. The extra shank thickness 290 of this clip can be compensated for by trimming the butting faces of matrix portions 215 and 216, to receive such shank at 291 while butting directly against each other at 292, 292.

The rabbets 225 and/or 226 can be cut in continuous rather than discontinuous lengths, and they can also be cut slightly shallower than the depth needed to completely receive the clip flanges 275, 276. In the last-mentioned variation the flanges are pushed in to their full depth by having them compress the matrix at the inner end of the rabbets. Such compression does not weaken the matrix as much as the cutting of the added rabbet depth.

Alternatively web 270 can have its lower end hooked to one side rather than penetrating through a slot 277. Such hooked end can be received under a strap welded onto the diffuser wall. The assembled matrix is then mounted by first placing it on the burner body a little to one side of its desired final position so that the web hooks are facing their straps, and then sliding the matrix over to its final position to cause the web hooks to engage their straps.

Matrixes having longitudinal joints as in FIG. 8, can also have transverse joints as in U.S. Pat. No. 4,272,238. Where both such types of joints are used together a larger number of anchoring clips can be used, particularly adjacent clip-free transverse joints. Such clips can also be used in the transverse joints, if desired.

Very extensive matrixes can be stiffened by felting them around a stiff wire screen as in the construction of FIG. 9 in U.S. Pat. No. 4,272,237. Such a stiffened matrix securely clamped at its edges under metal holddown flanges can be used in twenty-inch widths with lengths as long as desired. Greater widths best have metal hooks looped through the wire screen imbedded in the matrix, extending out the rear face of the matrix and hooked to the diffuser.

Figure 16:
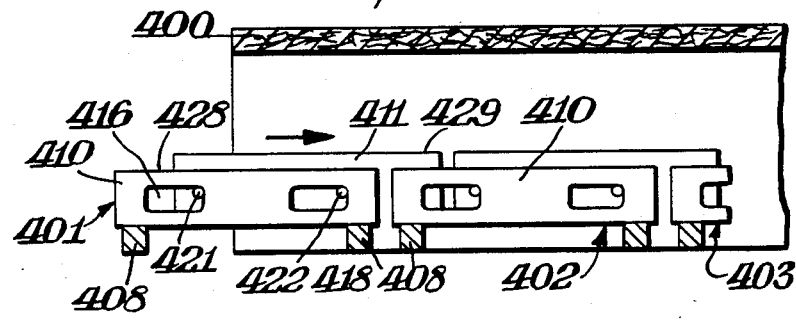
FIGS. 16 and 17 are fragmentary vertical sectional views of other annealing lehrs of the present invention.
Figure 17:
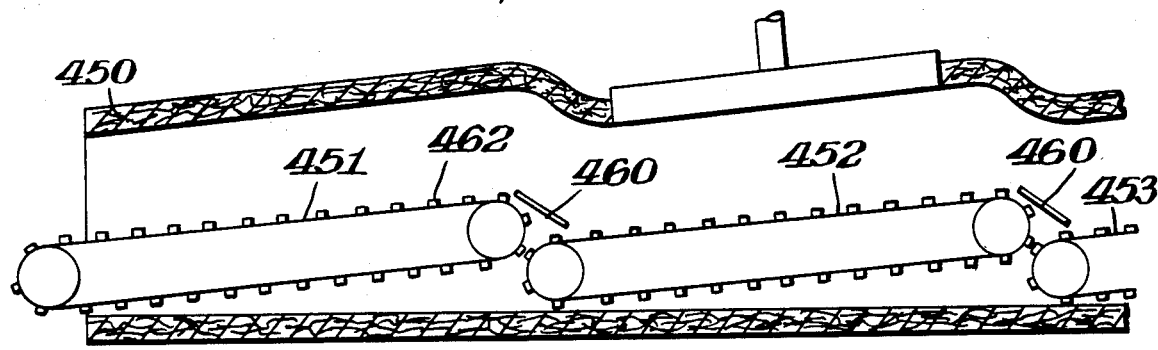

The novel matrix joints of the present invention can be used with burners that have air-seal margins as illustrated at 251 in FIG. 9, as well as in burners that have no air-seal margins such as those of FIGS. 16 and 17 of parent U.S. Pat. No. 4,236,843.

The burners of FIGS. 8 through 13 are particularly suited for use in glass annealing lehrs such as the one illustrated in FIG. 14. In FIG. 14 a lehr 300 is shown as an elongated heating tunnel 302 through which moves the upper flight 304 of a conveyor that carries electric light bulbs or other glass articles to be annealed.

The heating tunnel 302 has three sections, an inlet section 311 which is inclined upwardly, a heat-up section 312 which is shown as horizontal, and a long cooldown section 313 shown as inclined downwardly. The tunnel has its side walls and roof made of thermally insulating material such as felted ceramic fiber mats which can be two or more inches thick. Burners 321 and 322 are fitted into openings in the roof of heat-up section 312 and face downwardly to direct their high intensity infra-red energy down onto the conveyor flight 304 and the glass articles carried on that flight. The burners also discharge into the tunnel large outputs of hot combustion gases they generate.

To the extent that the lower face of burners 321 and 302 contain metal components such as matrix holddown flanges 210 of FIG. 8, such components are best covered by thermal insulation as in the construction of FIG. 8 in U.S. Pat. No. 4,272,238. The sides and upper surfaces of burners 321 and 322 need no thermal insulation; the sides are in contact with the thermal insulation of the roof and thus shielded from absorbing excessive heat from the tunnel, and the upper metal portions of the burners can be left exposed to the atmosphere above the tunnel inasmuch as this arrangement will not cause overheating of the metal.

The work-carrying conveyor is preferably made of a succession of thermal insulation blocks 317 each cemented to a sheet metal plate 319 having a downwardly bent flange equipped with rollers 325 to ride over a slotted guide surface 327. Each plate 319 is pivoted at its leading and trailing edges to the adjacent plates, and the plates are not physically carried into the tunnel but are exposed to the atmosphere below the tunnel. The plates are accordingly not directly heated by the tunnel atmosphere or radiation, except at the small gaps at 331, 332, where the conveyor flight 304 goes through minor changes in direction. These gaps are preferably located so that they are not under a burner in order to minimize the amount of radiation that penetrates into the gaps.

Insulation blocks 317 are as wide as the tunnel interiors. To reduce the frictional effects of the tunnel side walls on the sides of these blocks, the block sides can be covered with metal foil that can be cemented on by way of example, and thus slide against the tunnel wall surfaces without significant damage.

The interior of the heating tunnel can be as much as 40 or more inches wide so as to treat large as well as small articles. The height of that tunnel interior is generally at least about two, preferably at least about four inches and not over six inches more than the height of the articles to be treated. Thus, a nine-inch high tunnel interior does a very good job annealing articles about three inches high. Only two of the doubled burners of FIG. 8 are generally sufficient to provide all the heating needed for even the widest tunnels.

The floor 335 of the tunnel interior in section 312 is preferably at a level a little higher than the top 336 of the tunnel entrance, and also a little higher than the top 337 of the tunnel exit. This relationship is provided by suitably inclining tunnel sections 311 and 313. Section 311 can thus be inclined upwardly about 10 to 15 degrees, and section 313 inclined downwardly about 3 to 6 degrees. In such an arrangement the hot combusted gases generated by the burners accumulate and fill section 312 completely, down to its floor 335, before these gases spill out upwardly from the tunnel's inlet and outlet openings. The articles being annealed are thus assured of thorough heat-up in section 312.

The top 337 of the tunnel outlet is preferably a little higher than the top 336 of the tunnel inlet, so that the hot combusted gases preferably spill out of the tunnel's outlet. This enables section 313 to maintain a graded temperature that diminishes from the high heat-up temperature required in section 312 to the low terminal annealing temperature at the tunnel exit. The hot combusted gases in section 313 cool as they flow to the outlet inasmuch as there is a loss of heat through the tunnel walls, ceiling and floor, and such loss is larger than the heat input provided by the flow of combusted gas and the movement of the conveyor flight with its load of articles. This loss of heat can be controlled as by varying the thickness of the walls and ceiling, to provide any desired annealing profile.

Where the articles being annealed are round and tend to roll down the inclined portions of the tunnel conveyor, the conveyor blocks 317 can be formed with depressions that receive the articles and thus keep them from rolling. Alternatively the blocks can be made wedge-shaped as indicated by the blocks 318 in FIG. 15, so that the tops of the blocks are horizontal or nearly horizontal as they climb up section 311. Such a modification will not help the articles roll down the downwardly sloping section 313, inasmuch as the junctures between adjacent blocks form pockets 339 that trap the articles.

The blocks can also be tapered in the opposite direction so that they carry upward in similar pockets the articles ascending section 311 of the tunnel. In such an embodiment, that opposite taper should be sufficient to maintain article-trapping pockets in the downwardly tilted section of the conveyor.

The entire tunnel 300 can be as much as 80 feet long or longer so that the conveyor flight can be moved at a rate as high as 20 or more feet per minute. Any convenient drive means can be used, such as the star wheel 341 with arms 343 engaging the hinge pins that connect the respective block supports 325 and project outwardly from those supports a sufficient distance to be engaged by arms 343. The conveyor also has a lower, or return, flight that is not illustrated but can take any form.

A feature of the construction of FIG. 14 is that the heat loss from the tunnel is extremely low. Thus, a conveyor flight made of metal that goes through the tunnel in uncovered condition, can absorb and thus waste more heat than is absorbed by the articles being annealed. The heat loss of the FIG. 14 construction can even be further diminished by hanging over the tunnel's inlet and outlet curtains that hang down close to the tunnel floor and are pushed aside by the articles on the conveyor as those articles enter and leave. Such curtaining reduces the outflow of hot combusted gases and in this way permits the use of less burner firing to maintain the desired temperatures.

The modified lehr construction of FIG. 16 has a series of stepping conveyors the first three of which are shown at 401, 402 and 403. Each stepping conveyor is made of a series of vertically positioned aligned side-by-side metal sheets or plates some of which 410 are rigidly held in place as by being welded to lower supports 408. Plates 410 are provided with windows 416, 418 aligned with the corresponding windows of the remainder of the plates in the same side-by-side set.

Alternate plates in each set are slidable as shown at 411, being carried on stepping rods 421, 422 that extend through the aligned windows of the fixed plates 410. By moving the stepping rods in a stepping cycle, any articles resting on the upper edges 428 of fixed plates are advanced in the direction of the arrow and placed on the next conveyor set. This advance is effected by (a) first, lifting plates 411 upwardly to cause their top edges 429 to lift the articles up from the top edges 428 of the fixed plates;
(b) second, advancing plates 411 to carry the lifted articles forward;
(c) third, lowering the advanced plates 411 to deposit the lifted articles one step in the forward direction on the top edge 428 of the fixed plates; and
(d) fourth, returning the lowered plates 411 back to their original position without carrying the articles backward.

The foregoing sequence can carry the articles several inches per step along a conveyor and from one conveyor to the next, through the entire tunnel 400 of a lehr. The successive conveyors need not have their upper or article-carrying at the same horizontal level. The stepping plates of one conveyor can deposit the articles they carry on the next conveyor even though the top of the next conveyor is an inch or so above or below the top of the first conveyor. Each conveyor can also be inclined upward or downwardly if desired, and provided with lugs that extend up from their upper edges to keep articles carried by them from rolling.

The stepping rods 421, 422 can extend out through the side walls of tunnel 400 and cammed through their cycles by external cam drives. Side wall drive slots through which the rods fit can be covered by thermal insulation blocks projecting beyond the slots and fastened to and stepping with the rods, to reduce the loss of heat from the tunnel through the drive slots.

The individual conveyors of the construction of FIG. 16 are preferably kept out of good thermal contact with each other. Such an arrangement minimizes the transfer of heat from the hot interior of the tunnel to the relatively cold conveyor ends that project out the tunnel ends.

FIG. 17 illustrates another lehr construction in which heat losses are sharply reduced in a similar manner. Here, a heating tunnel 450 is fitted with a series of belt conveyors including 451, 452, 453 that advance articles from one conveyor to the next through the tunnel. A small chute 460 is fitted between successive conveyors to guide the articles from one conveyor to the next. Conveyor can be inclined upwardly, as illustrated to compensate for the drop in chute 460, and/or to carry its articles in an upward inclination. Cleat strips 462 can be secured to the conveyor belts to keep articles from rolling down any inclination.

The use of infra-red radiation to heat articles, such as glass that are highly transparent to such radiation, has been found particularly effective for annealing those articles. It appears that the penetrating effect of the radiation makes its heating action significantly more diffuse and gradual than the heating action of hot gases alone, so that breakage due to thermal shock is reduced. Gas-fired infra-red radiation is even more desirable inasmuch as it is not only less expensive but the combustion gases emitted are not as hot as the combustion gases generated by simple burning so that they are less likely to cause thermal shock when used to help with the anneal heat-up.

Burner assemblies can be arranged to fire face down or to fire facing in either direction. Thus, they can be connected together to make a radiant roof for heating glass lehrs, for example. One convenient arrangement of this type has a row of elongated burners each connected by its ends to the opposite arms of an overhead rectangular frame. The burners can be spaced a little from each other to permit burnt combustion gases to escape between them, or they can be packaged together, preferably with thermal insulation strips squeezed between adjacent burners, to keep those gases from escaping upwardly.

The supporting arms of the frame can be made of metal tubing and can thus also be used to pipe to the burners their gas requirements. Thus, the piping frame can carry an air stream which is fed to the air-seal chamber of each air-seal burner in the group, and which is also fed to a gas-air mixer that is separately supplied with gas that it mixes with the air to make a combustion mixture fed to the combustion mixture plenums of the burners. Alternatively the burners can have connections at their opposite ends for receiving the respective supplies, with these ends coupled directly to and opening into the opposed arms of the piping frame, one of these arms carrying air alone, and the other carrying the combustion mixture. Flow-control valves can be provided in the combustion mixture connections to the individual burners for adjusting the burning pattern for the row of burners.

The radiant roof assembly can have its burners with or without air seals and needs no covering over the tops of the downwardly facing burners. Without such covering the burner backs can be directly exposed to the external atmosphere so that those bare backs are thus subjected to very effective cooling by that atmosphere. If the maximum temperatures are desired for workpieces subjected to heating by the roof, it is preferable to use burners without air seals and packed together to minimize upward escape of the combustion gases.

FIG. 18 illustrates a burner 1200 having a sheet metal body 1202 defining a combustion mixture plenum 1204 the mouth of which is covered by a ceramic fiber mat 1206. The burner body 1202 is of box shape, rectangular in plan view, and each of its four sides carries a sheet metal angle, two of which are shown at 1211, 1212. Each angle has a horizontal flange 1216 and a vertical flange 1217, the horizontal flange being spot-welded at 1220 to the back wall 1225 of the burner body. The spots of the spot-welds can be spaced from each other as much as an inch or more since there is no need to make the attachment gas-tight. However the attachment can be made gas-tight by welding, if desired, or even by brazing.

The burner body 1202 has side walls 1208 that flare outwardly about 15 or 20 degrees from the vertical and extend about 1 or 2 inches down from the burner back wall 1225. The vertical flanges 1217 of the angles 1211, 1212 depend about an inch or so below the lower edges 1229 of the body side walls 1208, to define cementing sites 1232 for receiving the edges of mat 1206. The mat can be cemented in place in the same manner described in U.S. Pat. No. 4,326,843.

Edges 1229 are spaced a very small distance, preferably about $\frac{1}{4}$ to about $\frac{3}{8}$ inch, from the vertical flanges 1217 to leave a slot 1236 between them through which slot air-seal air or other non-combusting gas is discharged from the plenum 1240 defined by the angles 1211, 1212. This spacing also locates edges 1229 in place to act as positioning stops against which the mat 1206 is held when it is being cemented in place. This simplifies the cementing operation.

It is also helpful to have spacers mounted to the edges 1229, or to the opposed inner face of flanges 1217, to help make sure the desired slot width is maintained at 1236. Spacers can alternatively be formed as an extra horizontally directed lip bent out at edges 1229, which lip is perforated with a large number of closely spaced holes.

An air-seal stream only about $\frac{1}{8}$ inch thick is sufficient when blown through the mat alongside the cemented edges, to assure that the cement is not destroyed by the heat generated when the burner is in operation. The cement is accordingly preserved even when the sheet metal of the angles 1211, 1212 is a relatively poor conductor of heat, such as stainless steel about 50 mils thick. The cement need not withstand temperatures about 350° F., when it is confined to a zone within about $\frac{1}{8}$ inch of the metal face 1232, and the slot 1236 is $\frac{1}{4}$ inch wide.

An inlet connector 1238 can be provided in flange 1216 or 1217 of one or more of the angles, for the introduction of air-seal gas. A combustion mixture inlet 1239 is also provided for the introduction of combustion mixture into plenum 1204. A baffle, not illustrated, can also be mounted in plenum 1204 to deflect the incoming combustion mixture as shown in the above-cited patents.

Instead of outwardly flaring the side walls 1208, they can be made perpendicular, and then the flanges 1217 of the angles 1211, 1212 can be inclined inwardly. Such a construction is shown in FIG. 19 where angle flanges 1267 incline about 20 degrees. In this construction the inclination extends to cementing face 1262 and thus acts as an obstruction against downward movement of the mat 1266. This relieves the cement of much of the stress required in the construction of FIG. 18 to keep the mat from being blown out by the pressure of the combustion mixture in the combustion mixture plenum.

The FIG. 19 construction can be made with flanges 1267 relatively springy so that after welding to the burner body they can be pried outwardly to permit the insertion of the mat, and the flanges then released to return them to mat-engaging position. The angles can then be welded or cemented to each other at the four corners of the burner body to stiffen them against being pried open again. Alternatively all the burner components can be assembled in position and all the welding together effected at 1270 on the pre-assembled components.

A still further modification of FIG. 19 involves reshaping its peripheral angles so that the flange that extends over the back of the burner body in FIG. 19, is bent forwardly and fitted against and along the sides of the burner body. A set of such modified angles can be assembled, welded to each other and a matrix cemented in such a frame. The matrix-carrying frame can then be slipped over a burner body and secured in a position in which the internal face of the matrix is pressed against the burner body edges as shown in FIG. 19. The parts can then be secured in such relation as by one or more straps or clips spanning from the back of the body to the back of the frame angles and secured to both backs by sheet metal screws.

The matrix-carrying frame can also be fixed in place by the air-seal piping that is connected to it as at 1238 in FIG. 18.

Such a further modified burner construction has the advantage of making the matrix more readily replaceable. Thus, a damaged matrix is easily removed along with its mounting frame, and replaced by a fresh matrix previously cemented to a replacement frame or to the original frame after that frame has been cleaned of old cement and old matrix.

If desired, the angles 1211, 1212 etc. can have additional matrix-retaining flanges projecting toward each other at the mouth of the burner body. Such flanges can be narrow and perforated, like flange 70 of FIG. 2. Alternatively matrix 1206 can have its edges held in metal channels with or without the cement, as described in connection with FIGS. 2 and 3, and be mechanically held in place as by screws penetrating through flanges 1217 and threadedly engaged in such channels.

FIG. 20 illustrates a burner 1300 having its matrix 1306 held in place both by cement 1362 around its edges as well as by tangs or teeth 1363 struck out from a sheet metal angle 1317 that forms an air-seal plenum 1340. This construction can otherwise be like that of FIG. 8 with the hold-down angles of FIG. 8 removed and with its air-seal angles replaced.

Thermal insulation panels 1351, 1352 and 1353 are fitted around the body of burner 1300, and can be secured in place as by clamping angles 1355 bolted to threaded sockets 1359 pre-fitted in angles 1317. Insulating panel 1351 preferably projects out about $\frac{1}{8}$ inch beyond the outer face of the matrix to help protect the matrix, and the outer $\frac{1}{8}$ inch of the edge 1372 of angles 1317 are bent outwardly to dig into panel 1351 and thus be less exposed to the radiation from the outer face of the matrix.

A burner matrix can be easily damaged, as for example, by a tool that is inadvertently poked into or through it, or by a water jet from a high pressure water line such as conventionally used to clean and hose down machinery. To minimize the damage that may be caused by a failure of the matrix, the combustion mixture plenum is preferably fitted with a sensitive pressure switch that responds when the pressure in the combustion mixture plenum drops sharply from the normal operating value. Thus, the normal operating pressure in the combustion mixture plenum can be on the order of 4 to 5 inches of water column, and a failure of the matrix is generally associated with the ignition and detonation of the combustion mixture in the combustion mixture plenum. This explodes outwardly a portion of the matrix and the plenum pressure then drops to about 1 inch or less of water column. The ignition and explosion leaves the combustion mixture burning freely in the combustion mixture plenum, and if such burning is permitted to continue for any length of time the interior, back and upper walls of the burner can be overheated and can warp sometimes rather badly.

The pressure switch can be connected to immediately shut off the combustion mixture flow to the burner when there is the foregoing drop in combustion mixture plenum pressure. This shut-off will also put out the flames and thus prevent damage to the burner body. The matrix can then be replaced and the burner quickly returned to use. Had the burner body been permitted to warp, the entire burner generally would have to be replaced, and such replacement may involve extended delay because the burner would have to be remanufactured and shipped to its destination.

The pressure-sensitive switch can be energized by an electric current that is applied after the combustion mixture flow has commenced and has built up to the operating pressure in the combustion mixture plenum. Generally, a large blower is connected to supply the air at the necessary pressure for the combustion mixture, and the steam of air thus supplied is arranged to be mixed with the gas that completes the mixture, and the resulting mixture fed to trimming valves for individual burners or burner compartments. Automatic ignition equipment is then conveniently used to open the flow of combustion mixture into the combustion mixture plenum, and it only takes a few seconds for the combustion mixture to so build up to its operating pressure there. When the automatic combustion equipment detects the pressure of flame on the outer surface of the matrix it automatically shuts down its ignition, and this shut-down provides a signal for energizing the pressure-sensitive switch in the combustion mixture plenum. It is only after such energizing that such switch will respond to cut off the mixture flow when the matrix fails.

The ceramic fiber matrixes used in the burners of the present invention can have their outer margins impregnated to stiffen them and/or to render those margins non-porous. Impregnants such as aqueous sodium silicate will when dried withstand the high temperatures of nearby incandescence, and such impregnants are preferred.

Stiffening of the matrix margins helps assure that the matrix is locked in placed by cementing as in FIG. 1, or by screws or the like that penetrate through the burner walls against which the matrix is mounted, and also penetrate into the matrix edges, as described in connection with FIG. 2. Such stiffening need only extend through the outermost ¼ inch of the matrix, as measured from the outer edge faces toward the center of the matrix, particularly if it is desired to maintain the air-seal function.

Where impregnation is applied sufficiently heavy to make the impregnated zone non-porous, a ¼ inch to ½ inch wide non-porous band around the matrix will keep the incandescence and the combustion mixture from reaching the matrix edges and the matrix supports. This will make it possible to reduce the width of any air-seal margin, or to completely eliminate the air-seal.

The matrix boards are made with their fibers bonded to each other throughout to thus impart some self-support and rigidity to the completed board. Without such bonding, the fibers which are generally about 6 mils thick or thinner are quite flexible and do not adhere to each other sufficiently even when those fibers are ½ inch long or longer. When all the fibers are bonded to each other by a hydrophilic binder such as starch or a modified starch, adequate rigidity is obtained particularly with the help of colloidal silica and clay as added impregnants. The incandescence generated when the burner is operated can destroy some or all of the bonding action at and close to the incandescent zone, but such zone is generally confined to a very shallow depth, about 1 millimeter or less into the incandescent face, so that when the boards are about an inch deep or deeper, the loss of binding function in that shallow portion of the depth is insignificant.

Matrix boards, particularly those in which the ceramic fibers are bonded by a hydrophilic binder, are sensitive to moisture. Thus, if a burner matrix is subjected to very high moisture concentration when it is not being fired, that matrix can lose enough of its stiffness so that it is damaged by the flexing it is subjected to when the combustion mixture pressure is applied to place the burner in use. Such damage generally leads to early matrix failure.

A steam outlet or heavy fog can subject an unfired matrix to excess moisture vapor, and a gentle hosing such as generally used to wash down equipment is even more damaging. Such damage can be greatly reduced or completely avoided by coating the matrix fibers with a water-repelling agent such as a silicone oil or polypropylene or natural or synthetic rubber, or even formaldehyde resins. As little as 1% of such a water-proofing agent by weight of the matrix is enough but as much as 5% can be used if desired. Such binders can be added as dispersions in water, to the ceramic fiber suspension from which the matrix is formed. Where other binders are used, they are preferably applied first and the water-repellent agent added later, as for example, after the previously applied binder is applied and set. It is also generally desirable when the water-repellent is added as a dispersion, to add about 50% to 100% more than is to be left on the matrix fibers.

The matrix can be completely formed before it is treated with the water-repellent, in which event the formed matrix can be sprayed with or immersed in a solution or dispersion of the water-repellent in a solvent that can be evaporated off or drained away. Thus, by way of example, the silicon-carbide-modified matrixes described, supra, can be made water-repellent during felting or by after-treating the otherwise completed matrix.

Silicone oils having a branched or unbranched or linear or cyclic structure, such as the DC oils marketed by Dow Corning, are very effective water-repellents for the purposes of the present invention. Dimethyl siloxanes in solution or in water water dispersion are particularly desirable.

Some of the water-repellent will be burnt away from the incandescent face of the matrix when it is placed in service, but as indicated above, this only removes a small fraction of the water-repellent. The matrix accordingly remains highly resistant to damage from moist flexing.

A matrix whose incandescent face is covered by a stretched metal screen as in FIG. 7, is thereby shielded against high pressure water streams that are sometimes used in hosing down equipment. Such streams can otherwise tear fibers loose where they impinge on the matrix surface and thus seriously damage the matrix. The finer the screen gauge and the coarser the screen wires, the better is the protection against such water jets. A set of parallel wires stretched directly against and across the face of the matrix, preferably across its shorter dimension, gives even better resistance against water jets.

The uniformity of the matrix fiber formation is generally not perfect and in some cases too inadequate. The non-uniformity is accompanied by variations in porosity that cause corresponding variations in incandescence, and the heat put out by the incandescence increases as the fourth power of its absolute temperature so that small variations in porosity yield very large variations in heat output.

Matrix uniformity can be improved as by subjecting to ultrasonic vibration the fiber dispersion from which the forming takes place. Thus, a number of spaced ultrasonic generators vibrating at about 25 to 50 kilocycles per second with an output of at least about 10 watts can be immersed in the dispersion as it is being sucked or drained through a wire-forming screen. The screen can also be vibrated during the formation, with or without the ultrasonic vibration of the fibers. The dispersion can alternatively be poured over a moving forming screen from headboxes as in the Fourdrinier technique, while the headboxes can be vibrated and/or traversed laterally across the forming wire.

Increasing the degree of forming suction also helps improve uniformity, as does shortening the ceramic fibers and forming thinner matrixes. Thus, the fibers can be reduced in length to about two millimeters or even less, and a one-inch thick matrix can be prepared by first forming two half-inch thick boards, or three one-third inch thick boards, and then laminating these thin boards together preferably while they are still very wet. Additional binder can be applied between these laminations to help lock them together as they dry or after they have been dried.

The non-uniformities are generally located near the back face of the matrix, that is the face opposite the face which is formed against the forming screen. The matrixes are generally formed to a thickness somewhat greater than that desired for the burner, and both surfaces are then sanded to dimension, but it is helpful to do little or no sanding of the face that had been formed against the screen, and the maximum sanding of the back face.

Another technique for improving uniformity is to test fire a matrix, note the spots at which it becomes too brightly incandescent, and then remove the matrix and pour an appropriate quantity of a fiber dispersion through the matrix at those spots.

The infra-red heating of the present invention can be applied as the first or the last heat treatment stage of a wet web, or at any intermediate point in the drying of the web. Because the gas-fired burners have an exceedingly high power density and can be made of almost diminutive size, they can be readily fitted into compact spaces and retrofitted into many prior art types of dryers.

As described in Ser. No. 752,908 and in U.S. Pat. No. 4,378,207, their use as the last heat treatment stage is particularly effective for adjusting the moisture profile across the width of a paper web as it is manufactured. Thus, as in the construction of FIG. 6 in that patent, a set of drying drums can have a profile dryer retrofitted into the cramped between-drum space one or two drums before the last drum of the set, and then the last drum or two can be de-energized so as not to contribute any significant drying.

The profile driers of U.S. Pat. No. 4,378,207 can be used as can the apparatus of FIG. 21. In this figure, a paper web 500, after leaving the last drying stage, is looped around rollers 501, 502, 503 and 504 so that it moves past two banks 511 and 512, of radiant heaters. Each heater can extend only about 6 inches or so along the widths of the web, and can extend 18 to 30 inches in the machine direction. One face of the web is irradiated by one heater bank, and the other face by the other bank. The heaters in each bank can be crowded together to cover the entire web width, or they can be spaced from each other, as illustrated. For profiling purposes, only a few of the heaters are operated, in order to reduce the moisture content of the web in the width zones of the operated heaters, and this is controlled by standard automatic moisture profiling measurement equipment.

When the heaters are spaced from the others in the same bank, they are desirably offset from the similarly located heater in the other bank, as also illustrated in FIG. 21. This enables the entire web width to be exposed to the heaters.

When crowded together, the heaters provide double exposure of each width zone of the web, each exposure being at a different face of the web. Such two-sided heating gives more effective moisture loss than the corresponding two treatments on the same face.

The individual heaters can be controlled by merely turning them on or off, inasmuch as the amount of drying they effect is quite small. However, a modulation can be arranged, if desired, as by partitioning each heater into top and bottom sections, one section being twice as long in the machine direction, as the other section. This provides four degrees of operation—one with both sections off, a second with only the shorter section on, a third with only the longer section on, and a fourth with both sections on. The similar use of three sections per heater provides eight degrees of operation when the section lengths are in a 1:2:4 relation.

Modulation can also be arranged as by throttling down the flow of air used to receive a proportionate amount of combustion gas to form the combustion mixture that is fed to the individual burners or burner sections. Instead of using the standard type of air valves for this purpose, the inexpensive and compact valve construction of FIG. 22 is preferred.

In the construction of FIG. 22, modulating valve 520 is essentially a pipe tee 522 having the tee steam 524 closed by a plug 526 threaded or forced in place, the plug carrying a metal or rubber bellows 528 the interior 530 of which is sealed gas-tight against the plug.

A control passageway 532 penetrates through plug 526 and is connected by conduit 527 to actuating controls 534 and 536. Control 534 is connected by line 538 to a source of pressurized air, and is shown in non-actuated position as by bias spring 540, in which position it blocks access to conduit 527. When actuated, manually or otherwise, it connects line 538 to conduit 527 and thus causes pressurized air to be forced into the interior of bellows 530, thus expanding the bellows.

Control 536 when non-actuated similarly blocks conduit 527, but when actuated, opens conduit 527 to vent line 542. This releases air from the interior of bellows 530 and causes the bellows to contract.

A single self-centering toggle level can be mechanically connected to activate control 534 when toggled to one side of its center, and to activate control 536 when toggled to the other side of its center.

One arm 544 of tee 520 can be connected to a supply of the air to be modulated, as shown in FIG. 22, and the other arm 546 connected to a gas proportioner such as a ventur fed by a so-called zero pressure regulator on the feed line of an industrial supply of natural gas or propane or the like.

Operating the controls 534 and 536 permits the throttling of the air delivered at 546, in accordance with the degree the bellows is expanded. Since the burners or burner sections can be kept lit at low intensity even when not needed for drying, there is no need to have valve 520 act as a shut-off. Shutting off of air is very simple to effect by merely switching off the blower that supplies the air to arm 544. Moreover, zero-pressure regulators are generally arranged to automatically stop the flow of combustible gas when the blower is switched off.

The bellows 528 accordingly does not have to completely block the flow of throttled air. Indeed, the turning off of combustion mixture to a gas-fired burner in industrial equipment requires a safety sequence before the burner is turned on again, and is best avoided when practical.

When the heaters are spaced from adjacent heaters, they can also be shiftable as, for example, by the movable mountings of U.S. Pat. No. 4,514,913, so that they can be located over the width zones which are in need, or in greatest need of additional drying. Such shiftable heaters may be as narrow as four inches or even less in the cross-machine direction. In general, however, such widths can range up to eight or even ten inches for shiftable or non-shiftable heaters.

Figure 23:
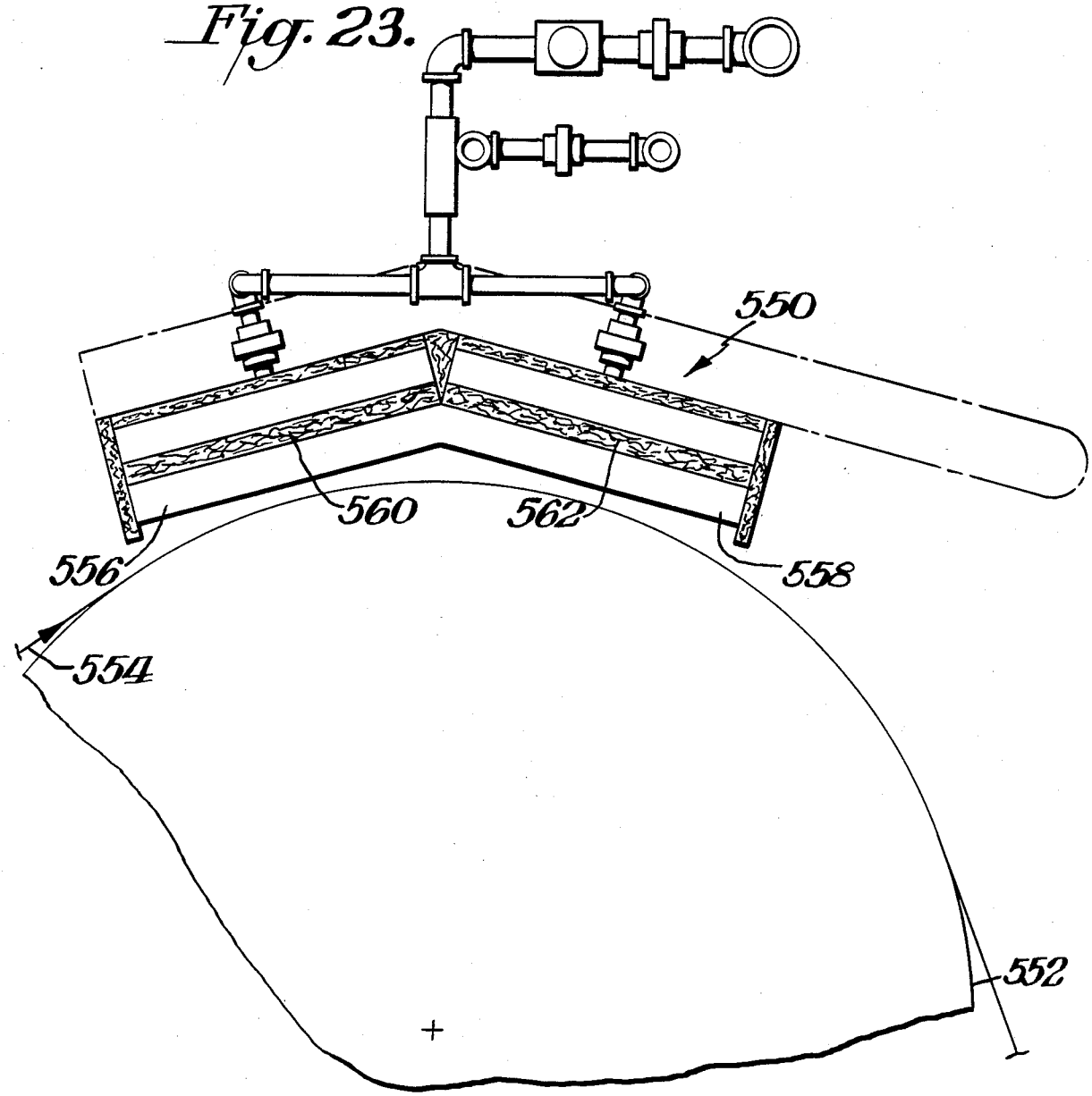
FIG. 23 is a cross-sectional view detailing a modified moisture profiling technique of the present invention.

By having the FIG. 21 apparatus as the last heat treatment before winding up the dried web, particularly effective moisture profiling is enabled. Similar high-efficiency is obtained by doing the profiling on the last drying drum of a papermaking line. This is illustrated in FIG. 23 where a burner assembly 550 is mounted very close to such a drying drum 552 over which a paper web 554 is trained. Assembly 550 has two individual burners 556 and 558, each with its own flat burner matrix 560, 562, about 2½ inches from the paper web and tilted about 15 to about 30 degrees to approximately follow the contour of drum 552. If desired, the matrixes 560 and 562 can be curved in the shape of cylindrical segments to even more closely follow the drum contour. Screen type burners or ceramic plate burners can also be used for profiling.

A single throttle control can be used to control a number of burners or burner sections that heat the same width portion of a web being profiled.

Figure 24:
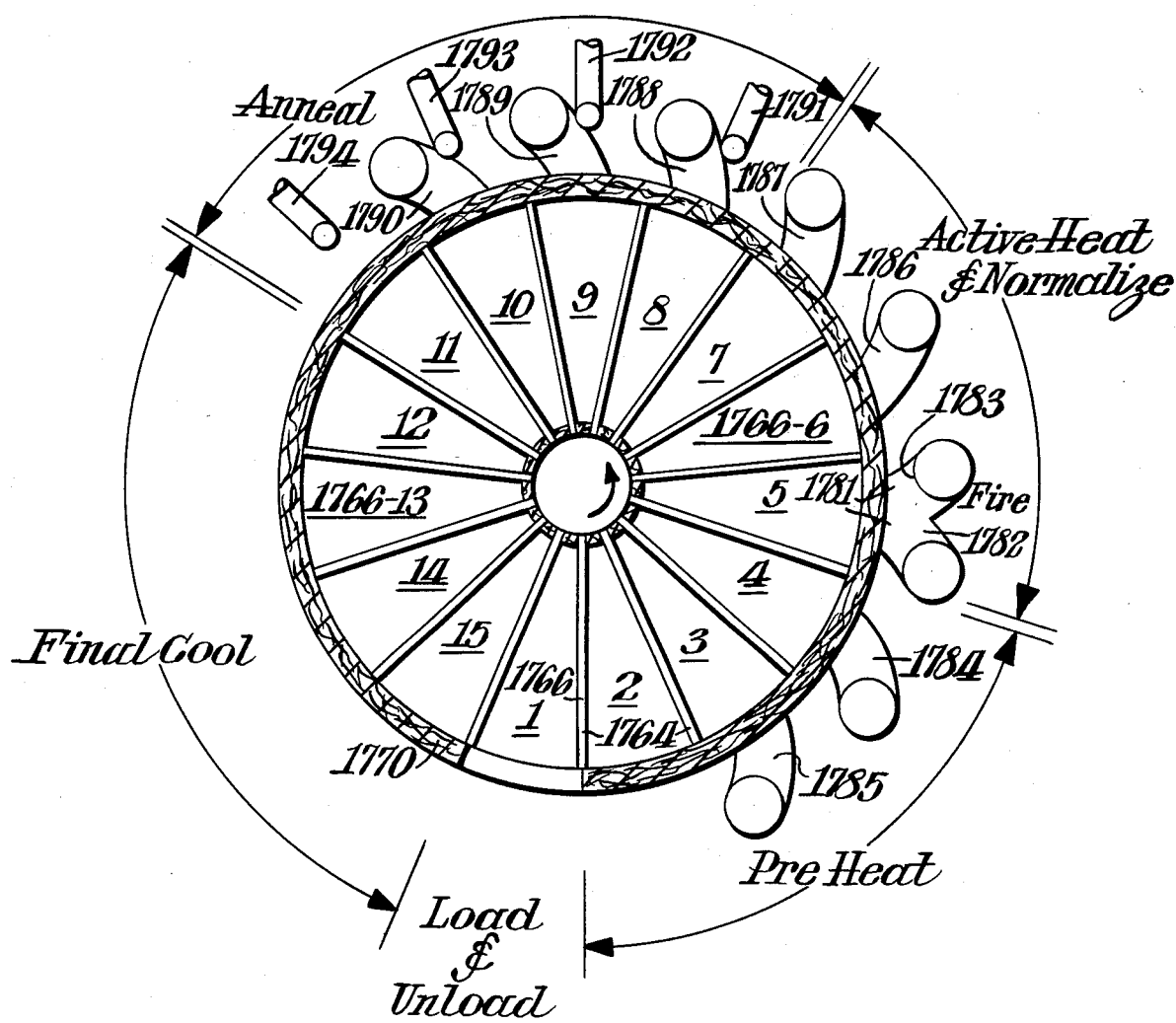
FIGS. 24 and 25 are horizontal and vertical sectional views of a rotary annealing heater according to the present invention.
Figure 25:
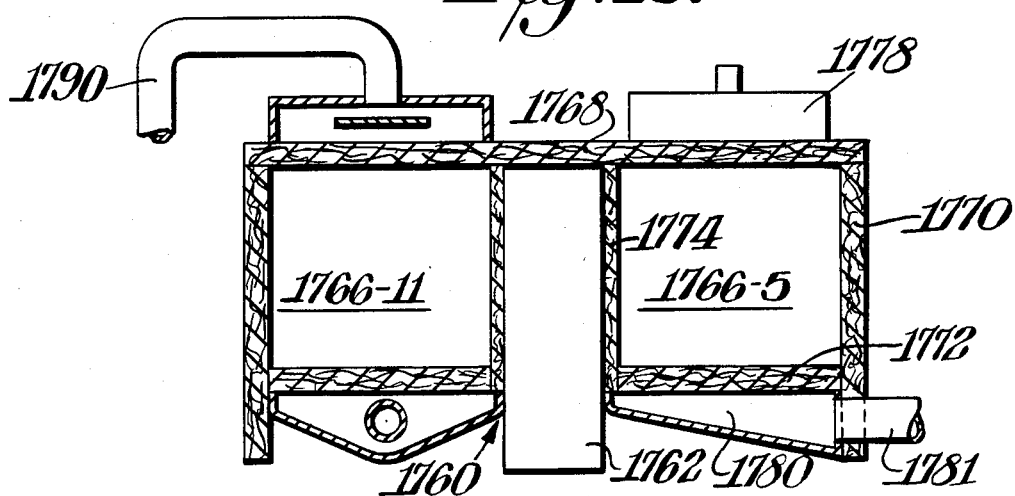

FIGS. 24 and 25 illustrate a modified annealing oven for annealing materials such as glass articles. This oven has a circular table 1760 of perforated metal plate mounted on a central pedestal 1762 rotated around its vertial axis by a motor-driven Geneva drive which causes the table to rotate in small steps. As shown in FIG. 24, the table top is fitted with a number of compartments 1766-1 through 1766-15.

The number of compartments corresponds to the number of table-rotating steps required to make one complete table revolution. The tops of the compartments are covered by a roof 1768 supported by a fixed circulated outer wall 1770 and which can also be supported by a rotatable mounting on the top of the pedestal.

The entire inner surface of each compartment is made of thermal insulation, such as molded ceramic fiber boards that withstand the highest temperature in the oven. Roof 1768 can be essentially entirely relatively rigid board of such type, with provision for mounting in or on it a number of components as described infra. Wall 1770 can similarly be curved relatively rigid board, preferably assembled from a series of arcuate portions secured together as by cemented butt joints of the type disclosed in U.S. Pat. No. 4,290,746. Wall 1770 is preferably externally re-enforced by a facing sheath of metal or the like to protect it against physical damage, and its arcuate insulation portions can be cemented to such metal sheathing.

Partitions 1764 can be stiff metal sheets or plates secured to the table and pedestal, and covered on both faces with thermal insulation boards that are anchored in place. The compartment floors are separate thermal insulation board segments 1772 each merely placed on the table top so that they can be easily removed and replaced. The thermal insulation is completed by thermal insulation strips 1774 secured to the outer surface of the pedestal.

All of the insulating members are fitted together to leave essentially no gap between them except at the side wall 1770 and roof 1768. At these locations a gap no greater than one to two millimeters is preferably provided to permit the edges of the partition to move by without wear or abrasion. Those partition edges as well as outer floor edges may be covered with thin sheet metal than can fill up the gap and slide over the opposing insulation surface with little or no wear. Thus, a stainless steel foil about 6 mils or about 1/7 millimeter thick will do a good job of reducing wear without conducting away any significant amount of heat.

Above compartment 1766-5 is mounted a gas-fired heater 1778 fitted over or in a cut-out section of the roof, to heat the contents of that compartment to normalizing temperature, for example. The insulating floor 1772 is made relatively porous, and below the floor of that compartment is a plenum 1780 that collects the hot gases from the heating in the compartment and conducts those collected gases to transfer conduit 1781. This transfer conduit forks into two branches 1782, 1783, the first leading to the top of compartment 1766-4 and the second to the top of compartment 1766-6. At those locations they fit in openings in the roof so that the hot gases in these conduits flow down through those adjoining compartments, as indicated in FIG. 25 for a different compartment.

Additional conduits 1784, 1785, 1786, 1787, 1788, 1789 and 1790 similarly lead from one compartment to the next to further transfer hot gases from the bottom of one to the top of the other. Controllable dampers can be provided in branched conduits 1782 and 1783 to control the distribution of the hot gases from compartment 1766-5.

Compartments -5, -6 and -7 are shown as normalizing compartments in which the articles to be annealed are brought to and held at temperatures that prepare them for the controlled annealing cool-down which takes place in compartments -8, -9, -10 and -11. The ducts feeding hot gases into those cool-down compartments can have auxiliary feed ducts 1791, 1792, 1793 and 1794 to supply a small controllable portion of cooler gas such as ambient air, to cool down the transferring hot gas as required for the annealing cool-down. Small blowers can be mounted in plenums or conduits and used to help with the various gas transfers.

The insulating ceiling board is preferably essentially completely gas-tight so that the gases in the compartments are not dissipated to any significant extent through their roofs. A somewhat greater degree of porosity can be tolerated in the pedestal covers 1774 and partitions 1764 when they are backed up by barriers such as imperforate metal walls. Some porosity can also be tolerated in partitions constructed with perforated metal sheet or with metal edge frames, inasmuch as the leakage of a little gas from one compartment to an adjacent compartment is not serious. However, the compartment floors are preferably so porous as to not too seriously impede the flow of gas through them. One of the small gas-transfer blowers can make up for any pressure drop.

The gases exhausting from the anneal cool-down in compartment -11 are still quite hot and can be supplied to compartments -2, -3 and -4 or any of them, to help pre-heat the articles to be annealed. Such supply can be in addition to or take the place of the transfer to the pre-heat from firing compartment -5.

The air in compartment -12 where the final cool-down begins after the controlled annealing, is heated by the freshly annealed still hot articles, and this heated air can be drawn out and also delivered to any of the pre-heat compartments. Such expedited cooling in compartment -12 can make it unnecessary to have compartments -13, -14 and -15.

If desired, the total number of compartments can be reduced to very few. Thus, a five-compartment structure can have one pre-heat compartment, one normalizing compartment, one annealing, or critical cooling compartment, one final cooling compartment, and one load and unload compartment. The excess heat generated by the burner installation in the normalizing compartment in the form of excess hot combusted gas, can then be cycled over to the preheat compartment, and even lower temperature hot gases can be withdrawn from the final cooling compartment and delivered to the same pre-heat compartment. Both recycled hot gas stream can be mixed, or can be fed into the pre-heat compartment independently at different locations in that compartment or at separate times between steps.

The used recycled gases can be vented through the floors of the pre-heat and/or final cool compartments. However, it may be desirable or even essential to shut down the burner operation before the end of a step in the table rotation, in order to add a normalizing dwell to the active heat dwell in the normalizing compartment. During such burner shut-down, the venting can be blocked as by providing a flapper valve or damper below the floor of both the pre-heat and final cool compartments. Plenums 1780 can be fixed in place and secured to wall 1770, or they can be fixed to the floor so that they rotate with the table. In the latter construction, the venting shut-off valves can be fitted to the plenum outlets, if desired.

A six-compartment construction may be more desirable than a five-compartment construction. Not only does the six-compartment construction provide greater annealing capacity for any size table, but it also can improve the energy efficiency. Thus, the sixth compartment can be an extra pre-heat compartment, receiving hot gas recycled from the hotter normalizing compartment, while all the recovered hot gas from the final cool compartment can be recycled to the other cooler pre-heat compartment.

A seven-compartment table can be still better in that it can not only provide better heat recycling, but it can also provide a normalizing compartment separate from the active heating compartment. The latter feature enables continuous operation with the burner installation also burning continuously.

Compartment-1 is used for loading and unloading the articles being annealed, as by sliding out the article-carrying insulating board that constitutes the floor of that compartment, and replacing it with another floor board carrying fresh articles. Wall 1770 is left open at this location for that purpose.

When starting up the oven and the articles to be annealed have not yet reached compartment-6, the gas transfer from compartment-5 can be directed entirely or substantially entirely to the pre-heat compartments to speed the pre-heat and increase the heating efficiency. The stepping of the table can then be accelerated to take advantage of the faster pre-heat.

An annealing sequence that calls for a fifteen-minute normalizing followed by a twenty-minute controlled anneal cool-down can in the foregoing apparatus be readily effected with table stepping every five minutes. Other sequences can similarly be provided with suitably modified compartmentation and stepping. If desired, the outer wall 1770 can be frusto-conical in shape so that it tapers together at the top, and the wall and roof raised a little every time the table is stepped, lowered again when the step is completed. Such raising provides extra clearance between the partition edges and the roof as well as wall, so that the table rotation then causes less wear of the insulation. As little as a 3-millimeter raising to provide a 1-millimeter clearance at wall 1770 is very effective, and in such event the insulation can be tightly fitted all around each compartment when the roof is in its down position.

Heater 1778 can be any heater that supplies hot combustion gases, but preferably also supplies high intensity infra-red radiation. The transfer of the hot gases between compartments can take other forms and can be from and to any portions of the respective compartments, such as the sides and roof. The pedestal can be hollow with its hollow interior also used for gas transfer.

The gas-fired radiant heating burners of the present invention are particularly suited for use in glass annealing lehrs such as illustrated in FIGS. 14, 15, 16 and 17 or in those described in FIGS. 24 and 25. The advantages including less glass breakage have been pointed out, supra.

As a tensioning device for the foregoing conveyors and even for paper-machine rolls that can be over 100 inches wide, it is preferred to use the pivoted tensioning frame of FIGS. 26 and 27. Here, a tensioning roller 260 is journalled at each end to the corresponding ends of an essentially rigid frame 262, which in turn is pivoted at 264 and 266 to an apparatus framework 268. The frame 262 is also resiliently held in a tilted up position as shown, by an air bag 271 having its ends 272 and 274 fitted between a cross member 279 on framework 268, and a bracket assembly 278 centrally mounted on pivoted frame 262.

The tensioning assembly is mounted to position its tensioning roller 260 above the space between two cooperating rollers 280 and 282 around which is framed the conveyor or web 284 being tensioned. By connecting the interior of the air bag to a source of air under a controlled pressure, the air bag will urge pivoted frame 262 upwardly with a force that can be correspondingly controlled and which will correspondingly maintain conveyor tension.

The apparatus of FIGS. 26 and 27 operates so smoothly and effectively that the air pressure in the air bag can be maintained at a fixed value, to enable sustained operation without intervening adjustments, on paper-machine rolls as wide as 120 inches and wider. The air pressure automatic adjustment usually used to respond to the load on one of the cooperating rolls 280 or 282 is not needed. The pivotal action and rigidity of frame 262 are key features of this action and to this end the frame should not permit a one millimeter deflection of the tensioning roller.

FIGS. 28 and 29 illustrate a modified burner that does not have an air seal around its matrix. It is very similar in its construction to the burner of FIG. 17 in parent U.S. Pat. No. 4,416,618, but includes provisions for additional cooling of the burner mouth so the burner mouth as well as the balance of the burner body can be made of inexpensive low carbon cold rolled steel sheeting only about 16 or 17 gauge in thickness. Such steel has a thermal conductivity much greater than that of stainless steel.

The burner of FIGS. 28 and 29 includes a body or shell 601 in the form of an open box having a rectangular bottom 603, and four side walls 605,606, 605,607 and 605,608. The interior height of shell 601 is only about 35 millimeters, and in its mouth is cemented a ceramic fiber matrix only 15 or 16 millimeters thick. A baffle 610 in the form of a sheet of the steel is welded to the interiors of the four side walls so as to extend essentially across the entire body. A series of very narrow spacing slots 612 around the periphery of baffle 610 provide communication between the combustion mixture inlet chamber 612 below the baffle, and the combustion mixture plenum 614 above the plenum. Chamber 612 is about 12 millimeters deep, plenum 612 about 5 to 6 millimeters deep, and slots 612 only about 0.7 to about 1 millimeter wide in the direction perpendicular to the adjacent side wall.

Baffle 610 also has a series of positioning slots 618 extending perpendicularly inwards from the baffle edges, and not more than about 7.5 centimeters apart. In each of these positioning slots is received a knee 620 of the same sheet metal used for the burner body and the baffle. Each knee has a generally vertically extending outer edge 622 which terminates at its upper portion in a tab 624 fitted into an anchoring slot 626 in the burner side wall. Each knee also has a generally horizontally extending lower edge also provided with a tab 628 fitted into an anchoring slot 630 in the burner bottom 603.

The tabs 624 and 628 are welded into their receiving slots to make air-tight seals. Baffle 610 can be similarly secured, with tabs 632 fitted and welded into corresponding slots 634 in the side walls.

The weld of upper tabs 624 should extend to within about 8 millimeters of the upper edges of the side walls.

Such close spacing causes the weld to effectively transmit heat from the burner mouth to the knees and from there to the combustion mixture gases passing through the interior of the burner body. This helps protect the adhesive 638 used to cement the burner matrix 640 in place in the burner mouth, as described in parent U.S. Pat. No. 4,416,618. As there disclosed, the adhesive is preferably a high-temperature-resistant one such as a silicone cement, and it should not be permitted to reach a temperature above about 260° C. The construction of the burner permits this limit to be observed, using plain carbon steel burner side walls only about 1½ millimeters thick, and knees made of a corresponding thickness of such steel, providing the knees are no further than about 7.5 centimeters from the next knee or from a burner corner.

The narrowness of spacing slots 612 contributes to the heat dissipation inasmuch as the combustion gases move faster through the slots as the slots are made narrower. Such faster gas flow more rapidly abstracts heat from hot burner side walls.

The cooling of the burner mouth is further improved by making the knees 620 slightly taller so their top welds are closer to or actually reach the upper edge of the burner side walls.

The matrix 640 can be slotted to receive the knees. The engagement between a knee and the matrix edges contacting it is sealed with the high-temperature-resistant adhesive so as to be gas-tight. That engagement can also be perforated as illustrated at 644 to provide direct bonding of the matrix slot edges to each other.

The burner of FIGS. 28 and 29 is assembled by first punching out a corner notched body blank from the sheet steel, simultaneously or sequentially punching out all the body slots, folding up the four side walls, inserting previously prepared knees and baffle between the side walls before the side walls reach their fully erect position, completing the folding, then sealing the side wall joints as by welding or cementing, welding connection nipples in the floor, and finally cementing the matrix in place.

It is also helpful to use the above-described silicon-carbide-containing matrix in the burner of FIG. 28 place of an ordinary matrix, inasmuch as the silicon-carbide, containing matrix operates at a slightly lower incandescent temperature to effect corresponding irradiation. Another desirable arrangement uses a matrix which is grooved on its outer surface. Thus, a series of 3-millimeter wide grooves can be cut about 3 millimeters deep into the outer face of the matrix, and this causes the combustion mixture to develop a higher matrix surface temperature as compared to an ungrooved matrix. Less combustion mixture is accordingly used with grooved matrixes, and the total heat output is lower as measured by adding the radiant output to the non-radiant output. When operating a burner with its incandescent matrix surface facing downwardly, the non-radiant heat is in the form of very hot gases which rise around the burner and heat up its side walls.

If desired, matrix grooving can be arranged so that the groove stop at least about 3 millimeters short of the metal portions of the burner, so that those metal portions are not directly in contact with the more intense incandescence in the grooves.

The grooves can have any transverse configuration, rectangular, triangular, arcuate, etc. However, they should be 2 to 5 millimeters wide and 2 to 5 millimeters deep. Instead of well-defined grooves, they can merge into each other to provide an overall sinusoidal transverse configuration.

Grooving of the matrix is particularly desirable when the matrix contains at least 10% silicon carbide. With such high contents, the incandescence produced by the burning of the combustion mixture as it leaves the outer matrix face does not extend back as deeply into the body of the matrix. Thus in prior art burner matrixes, the incandescence reaches back about 2 to 3 millimeters, whereas in the high-silicon-carbide matrix the incandescence reaches back only about 1 millimeter. This shallow reach-back reduces the infra-red generating efficiency, and such reduction is offset by the matrix grooving.

The shallow reach-back also makes it desirable to use such high-silicon-carbide matrix in thicknesses not over about 19 millimeters thick, and as thin as about 13 millimeters.

FIG. 30 illustrates an alternative construction for the burner of FIG. 28. The FIG. 30 burner has a body 660 with side walls made thicker by an extra flap 668 of steel sheet. This extra flat is an extension of flap 670 incorporated into the burner body blank, and folded against flap 670 to make a two-flap side wall. In this construction the thicker side wall combination reduces or eliminates the need for the knees 620, and they can be safely omitted so long as the matrix is not over about 20 millimeters thick and the plenum not more than about 7 millimeters deep.

A baffle 672 can be fitted into place as in FIG. 28, but need not be welded to the side walls. The stiffening provided by such welding is not needed where the side walls are double thick, and particularly where the burner is not more than about 30 centimeters in length or width. Indeed, as in FIG. 31, the baffle 675 can be merely loosely fitted over ledges 677 formed at the ends of the inner side wall flaps 679 on opposite ends of the burner, and under similar ledges 681 formed in the remaining opposing side wall flaps 681. A clearance of only about ½ to 1 millimeter between the baffle margins and the adjacent side wall ledges enables suitable combustion mixture flow. If desired, however, a series of openings can be pre-punched through the margins of the baffle or through the inner side wall flaps 679 to open into plenum 685.

Where the baffle is welded into place in FIG. 30, that welding need not be gas-tight.

The extra side wall flaps can be folded over the outside of the sidewall, rather than over the inside as shown in FIG. 30. Either construction can have a thermal insulation layer applied to the outer faces of the side walls to inhibit the absorption of heat from surrounding hot gases.

The double walls of the two fold side walls can be spaced from each other by about ½ to 1 millimeter, inasmuch as this improves the cooling of both folds by the relatively cold combustion mixture entering the burner.

The arcuate inner lip 689 of the doubled-over folds also makes it easier to insert the matrix.

The matrixes containing at least 10% silicon carbide, and as thin as 13 to 22 millimeters, preferably have their fibers of less expensive alumina-silica, rather than the more expensive chromia-containing alumina-silica, but zirconia-containing alumina-silica fibers as described in U.S. Pat. No. 4,555,492 are also desirable. Any of the foregoing matrixes can be manufactured in the same way, by molding from aqueous fiber slurries, using the standard binders including clay, colloidal silica and starch. Water-repellent silicone oils can be added to the slurry to produce a water-resistant matrix.

Because of the very small amount of reach-back when the high-silicone-carbide matrix is used, such a matrix cools down faster upon shut-off. Such a matrix is accordingly very effective for high-speed drying of printed paper as it comes from the printing operation. Parent application Ser. No. 771,722 discloses in connection with its FIG. 38 a snuffer that protects the output of such a paper printer when the printing is unexpectedly interrupted so the paper stops advancing. The snuffer then automatically clamps a pair of snuffer bars against the opposite faces of the paper and across its entire width while the burners are automatically shut off. The snuffer bars have non-combustible faces which extend about a decimeter in the machine direction so that any burning of the stopped paper that may be triggered by the high temperature remaining at the shut off heaters, will not pass the snuffer bars. The foregoing disclosure of Ser. No. 771,722 is hereby incorporated in the present application as though fully set forth.

The shutting off of the print-drying burners is speeded by automatically stopping the flow of the entire gaseous combustion. This causes a more rapid cool-down as compared to merely stopping the flow of gas while continuing the flow of the air that had been mixed with the gas to make the combustion mixture.

Even this more rapid cool-down can still permit charring and ignition of paper which is suddenly stopped. It is helpful in this connection to provide a print-drying burner with an arrangement as in FIG. 37 of Ser. No. 771,722, that projects a vigorous stream of cool air across essentially the entire surface of the printed paper facing a burner. Such a cooling stream can be automatically triggered when the paper travel stops, or where the burner face is more than about one decimeter from the paper it can be operated on a continuous basis. The stream can be directed upstream or downstream of the paper travel, or transversely across the paper, but should be sufficiently vigorous to very rapidly cool down the entire irradiation zone, and each burner should have its own separate cooling stream. The stream velocity can be as little as about 3 linear meters per second when it is to traverse a 3-decimeter irradiation zone. But, it is generally necessary to project the stream at about 15 meters per second to assure that after traveling 3 linear decimeters its linear velocity will still be at least 10 meters per second. Similarly, the projected stream should be at least about 4 centimeters thick to assure that enough cooling air reaches the far end of the irradiation zone. A suitable arrangement projects a 5 centimeter thick stream of 30° C. air at 20 meters per second upstream across a burner face which extends 3 decimeters in the machine direction.

The print-drying burners can be modulated to operate at intensities correlated with the advancing speed of the paper, and the cooling air can be modulated in inverse manner. Thus, the cooling air flow can be stopped when the paper is moving very rapidly, it can be started when the paper advancement slows to about 5 decimeters per second, and can be turned on full when the paper speed slows to about 3 decimeters per second.

Where a stream of air is used to blow vapors away from the drying printed matter, the cooling stream can be kept operating at all times, preferably as a very shallow stream not over about one centimeter deep. As the paper speed drops to about 5 decimeters per second, the depth of the cooling stream can be increased to about 1½ centimeters, and when the paper speed reaches about 3 decimeters per second the stream depth can be increased to about 5 centimeters.

The burners of FIGS. 28 through 31 are preferably constructed in small sizes, as small as 15 by 31 centimeters mouth dimensions. However, such small burners can be mounted in groups alongside each other to provide larger irradiation zones. For such mounting, the side walls can be provided with securing devices such as blind riv-nuts which can be fitted in a gas-tight manner into holes pre-punched or drilled through those walls. One or more mounting bars of metal can then be provided with holes through which mounting screws can be inserted and then screwed into the riv-nuts to hold the corresponding burners in place in a preselected assembly pattern. The fitting of combustion mixture supply piping to the burner connection nipples also holds them in place.

The burners with cemented-in matrixes are generally so inexpensive to manufacture, particularly the burners of FIGS. 30 and 31, that they can be discarded when damaged. There is no need to replace a matrix in the field; instead, the entire burner is easily replaced.

Obviously, many modifications and variations of the present invention are possible in light of the above teachings. It is, therefore, to be understood that within the scope of the appended claims, the invention may be practiced otherwise than as specifically described.

I claim:

1. In the process of irradiating a substrate with infrared radiation from the incandescent surface of a felted ceramic fiber matrix about one inch thick through the thickness of which a gaseous combustion mixture is passed and as it emerges caused to burn, the improvement according to which the incandescent surface contains at least about 5% silicon carbide by weight.

2. In a ceramic fiber burner having a ceramic fiber mat about one inch thick, one face of which covers a combustion mixture plenum so that gaseous combustion mixture passes from the plenum through that face as well as through the thickness of the mat and burns as it emerges from the opposite face of the mat, the improvement according to which that opposite mat face contains about 5% to about 34% of silicon carbide particles by weight of the ceramic fibers.

3. The combination of claim 2 in which the silicon carbide particles are about 2 to about 100 microns in size.

4. The combination of claim 2 in which the silicon carbide particles are in fibrous form.

5. A ceramic fiber burner mat about one inch thick and containing from about 5% to about 34% silicon carbide particles by weight.

* * * * *